(12) United States Patent
Podd

(10) Patent No.: US 12,063,937 B2
(45) Date of Patent: Aug. 20, 2024

(54) PIZZA HAVING ENHANCED STRUCTURE AND CONSUMABILITY WHEREIN ADDITIONAL DOUGH CRUST CONFIGURATIONS ARE ACCOMPLISHED BY FORMING, ADDING OR MASKING

(71) Applicant: George O. Podd, Lake Forest, IL (US)

(72) Inventor: George O. Podd, Lake Forest, IL (US)

(73) Assignee: Crust Cut LLC, Lake Forest, IL (US)

( * ) Notice: Subject to any disclaimer, the term of this patent is extended or adjusted under 35 U.S.C. 154(b) by 157 days.

(21) Appl. No.: 17/561,838

(22) Filed: Dec. 24, 2021

(65) Prior Publication Data
US 2023/0200398 A1 Jun. 29, 2023

(51) Int. Cl.
*A21D 13/41* (2017.01)
*A21D 8/02* (2006.01)

(52) U.S. Cl.
CPC .............. *A21D 13/41* (2017.01); *A21D 8/02* (2013.01)

(58) Field of Classification Search
None
See application file for complete search history.

(56) References Cited

U.S. PATENT DOCUMENTS

| | | |
|---|---|---|
| 3,677,769 A | 7/1972 | King |
| 5,508,049 A | 4/1996 | Kordic |
| 5,789,009 A | 8/1998 | Kordic et al. |
| 5,962,050 A * | 10/1999 | Adashek ............... A21C 11/00 426/94 |
| 2005/0042332 A1 | 2/2005 | Lonergan |
| 2007/0243292 A1 | 10/2007 | Graham et al. |
| 2009/0285939 A1 | 11/2009 | Matthews |
| 2010/0239719 A1 | 9/2010 | Matthews |
| 2020/0315186 A1 * | 10/2020 | Miceli ................. A21C 11/006 |

FOREIGN PATENT DOCUMENTS

WO  WO 98/00028  *  1/1998

OTHER PUBLICATIONS

A round pizza cut into squares sparks fiery Midwest vs East Coast debate, Jan. 10, 2020.*

* cited by examiner

*Primary Examiner* — Lien T Tran
(74) *Attorney, Agent, or Firm* — Scherrer Patent & Trademark Law, P.C.; Stephen T. Scherrer; Monique A. Morneault

(57) ABSTRACT

The typical configuration of the crust of a typical pizza or baked goods such as pies, quiches and other like goods is revised by exposing, forming, masking, and/or adding dough that enhances the structure of individual pieces, thereby producing pieces that are more easily consumed while maintain the desired non-compartmentalized area of the overall substrate. More specifically, such revised configurations enable producing isolated and exposed dough crust to the inside area, i.e., within the perimeter, of pizza and other baked goods, such that each piece cut from the pizza or other baked good has at least one edge having exposed crust thereon.

11 Claims, 17 Drawing Sheets

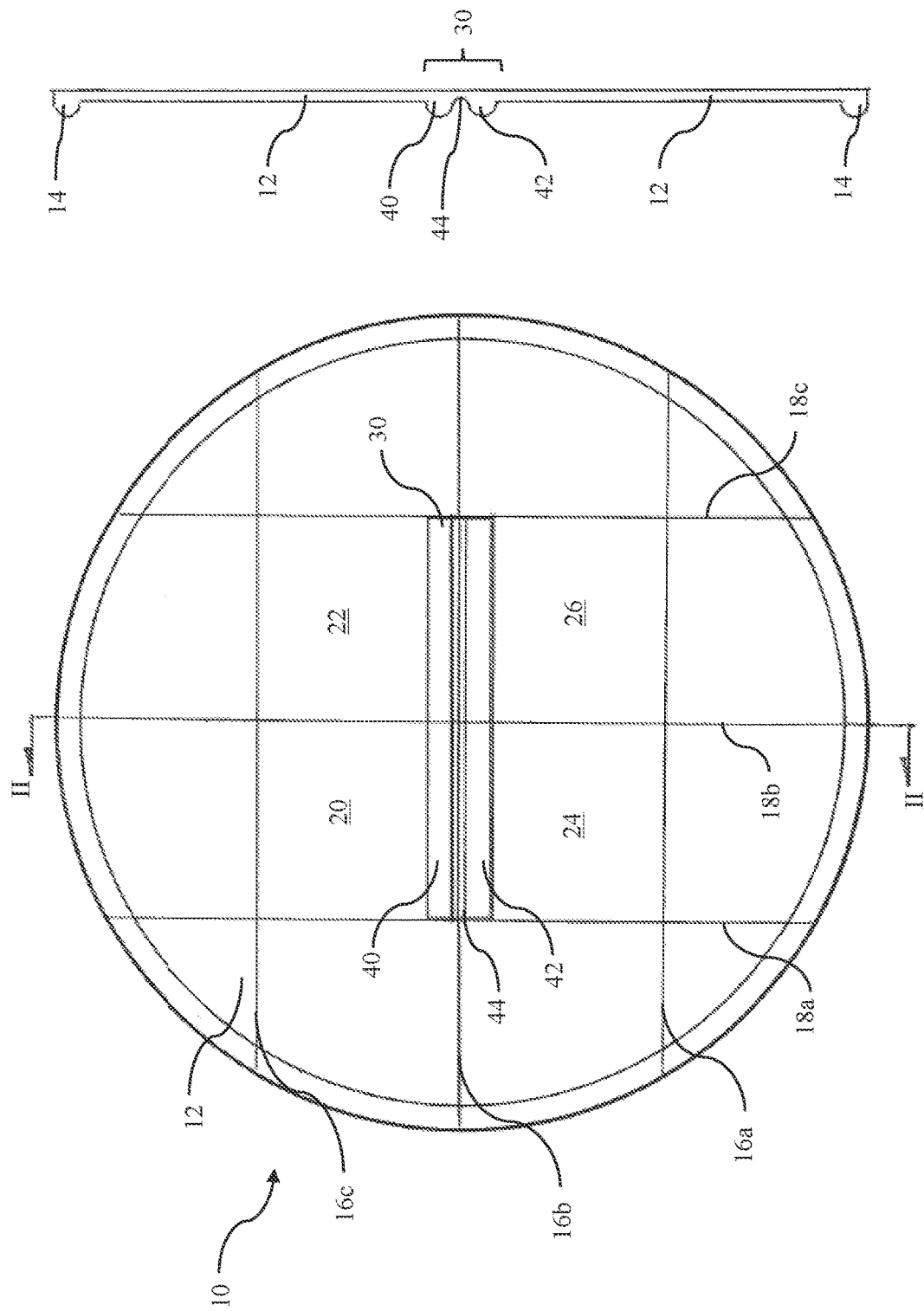

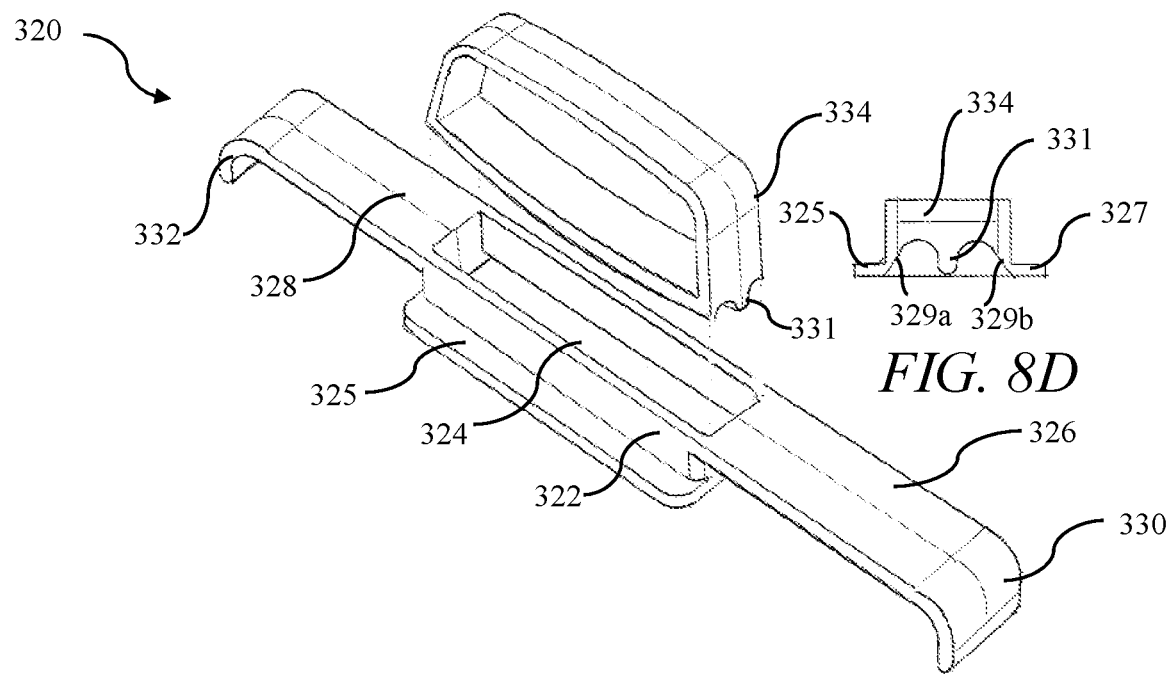
FIG. 8C
FIG. 8D
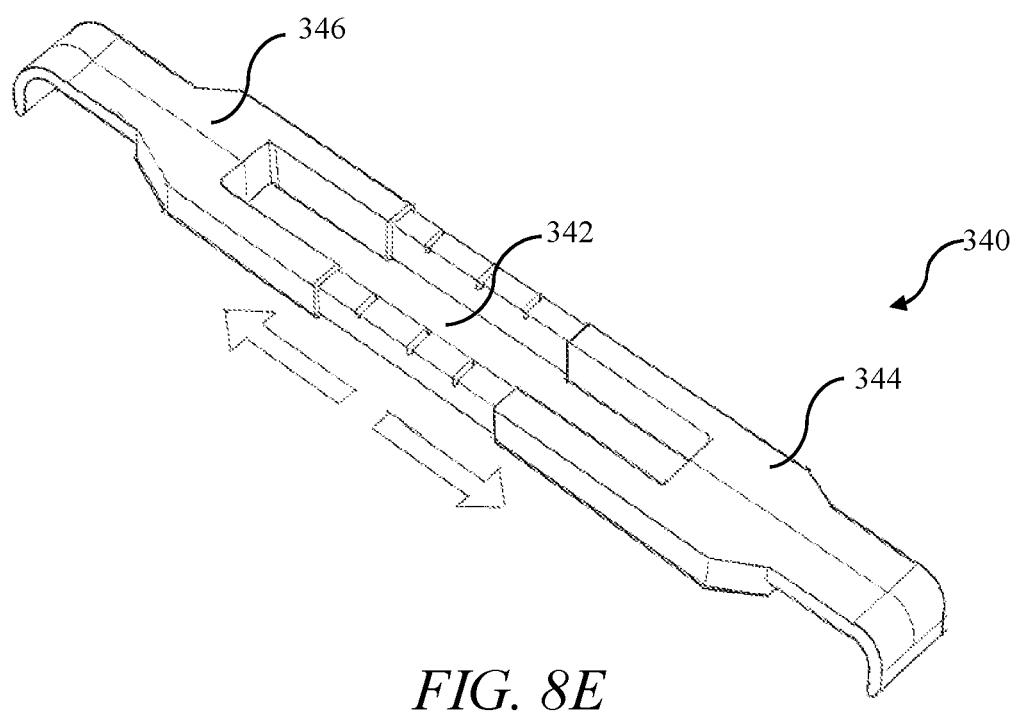
FIG. 8E

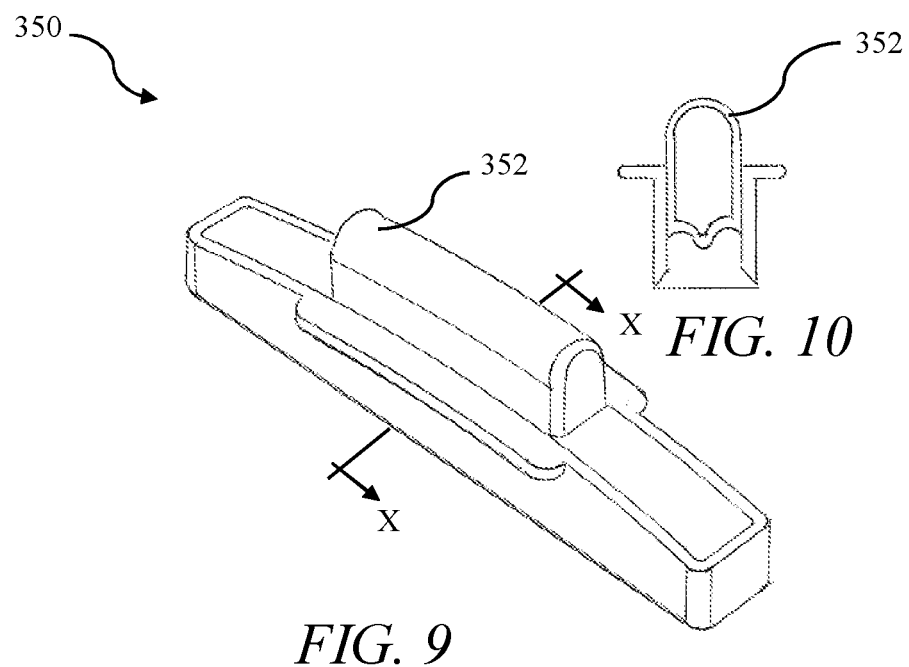
FIG. 9
FIG. 10
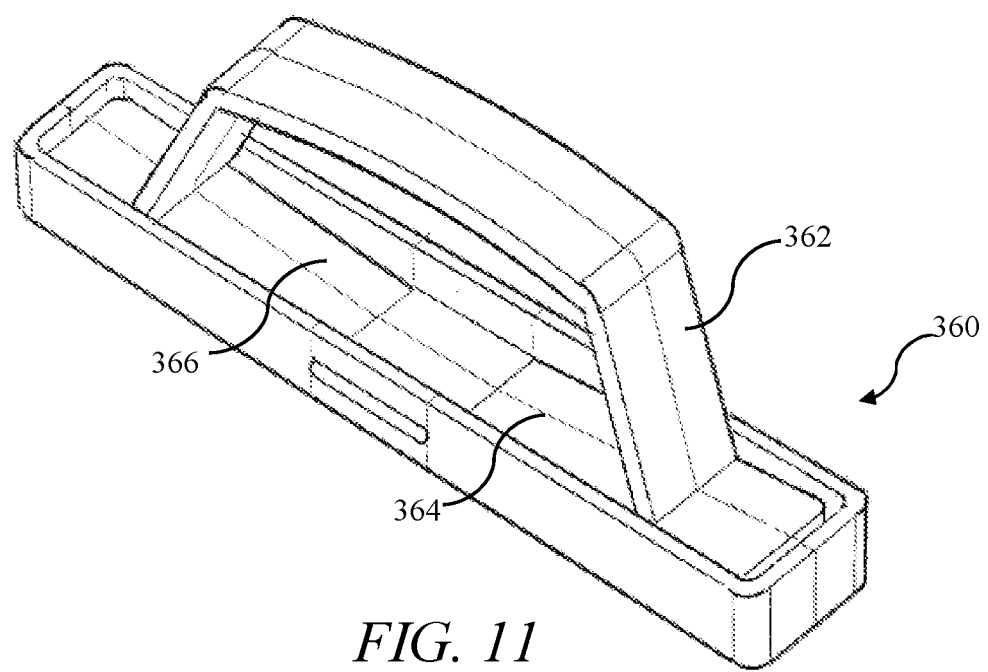
FIG. 11

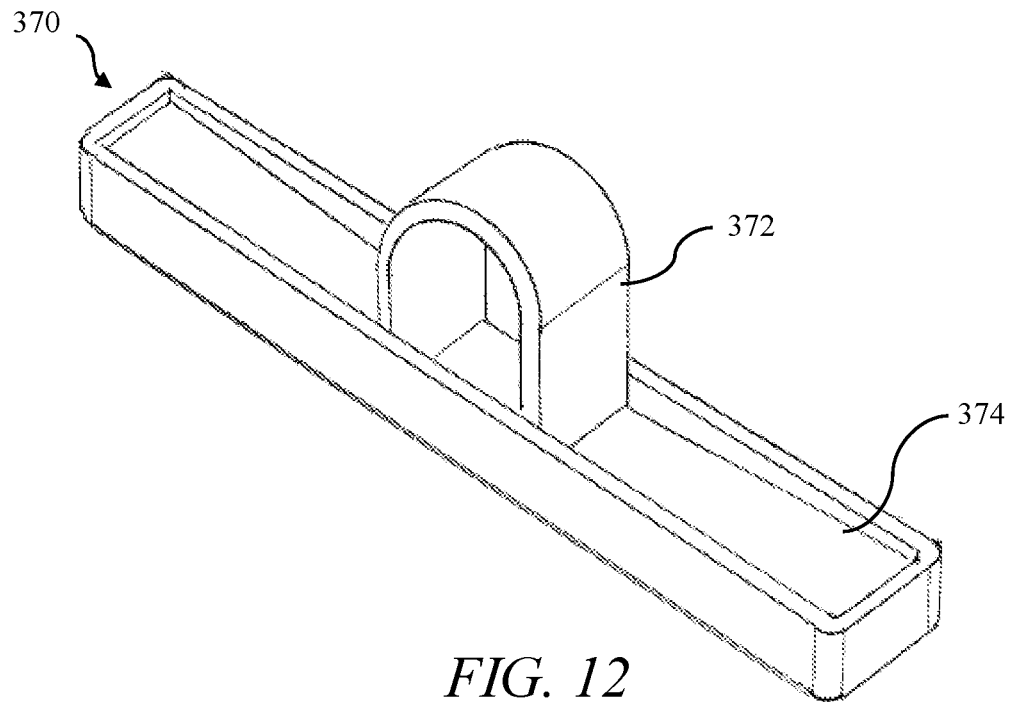
FIG. 12
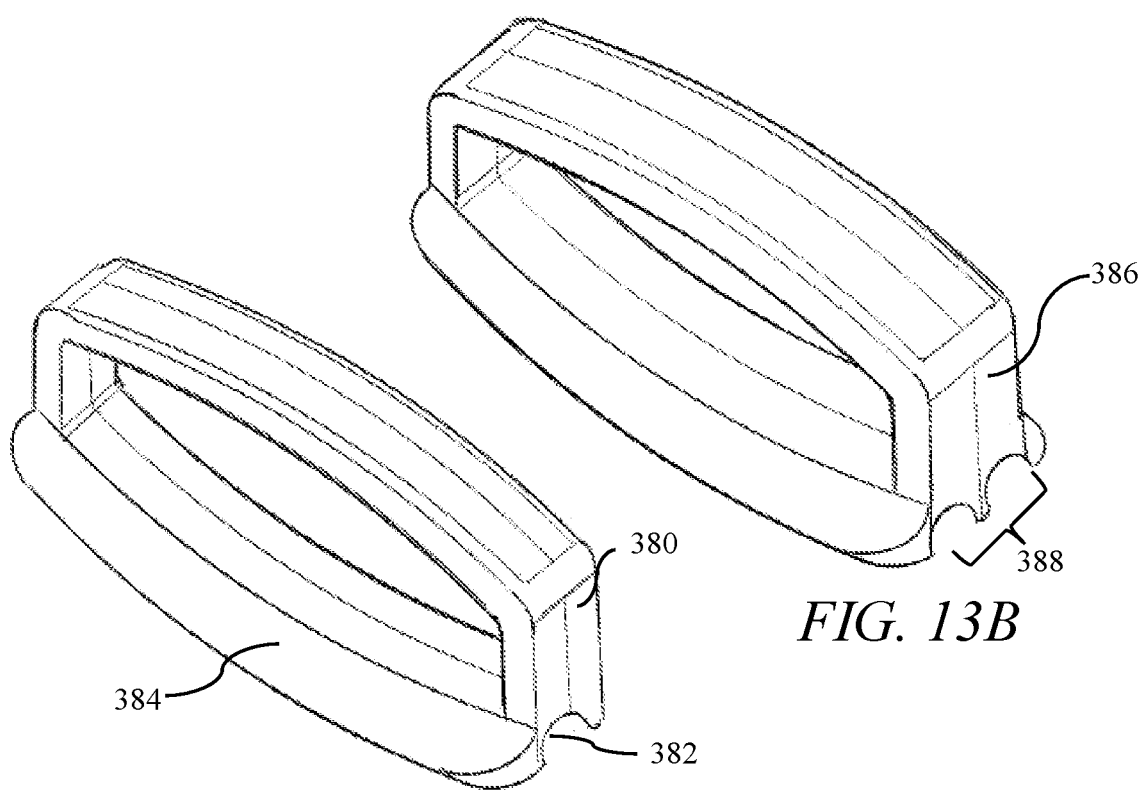
FIG. 13B
FIG. 13A

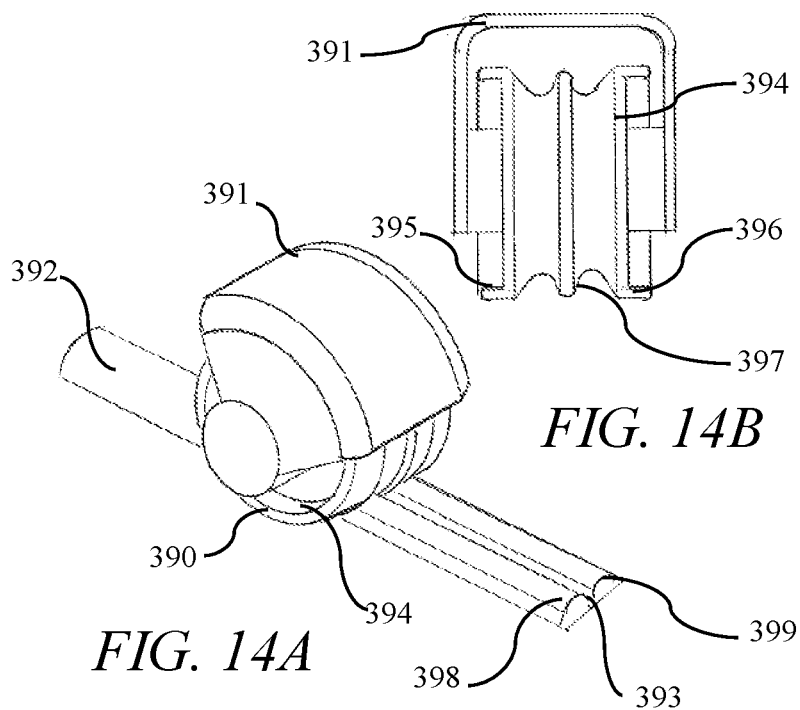
FIG. 14A
FIG. 14B
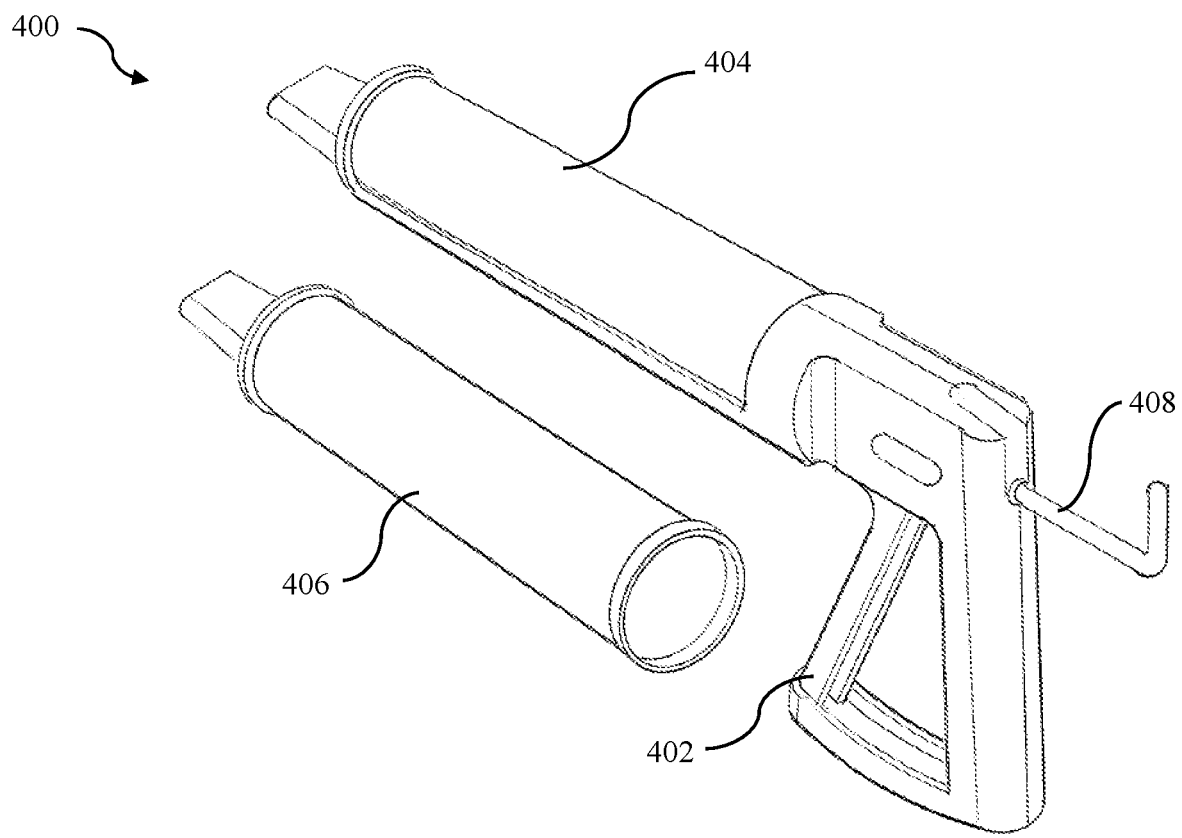
FIG. 15

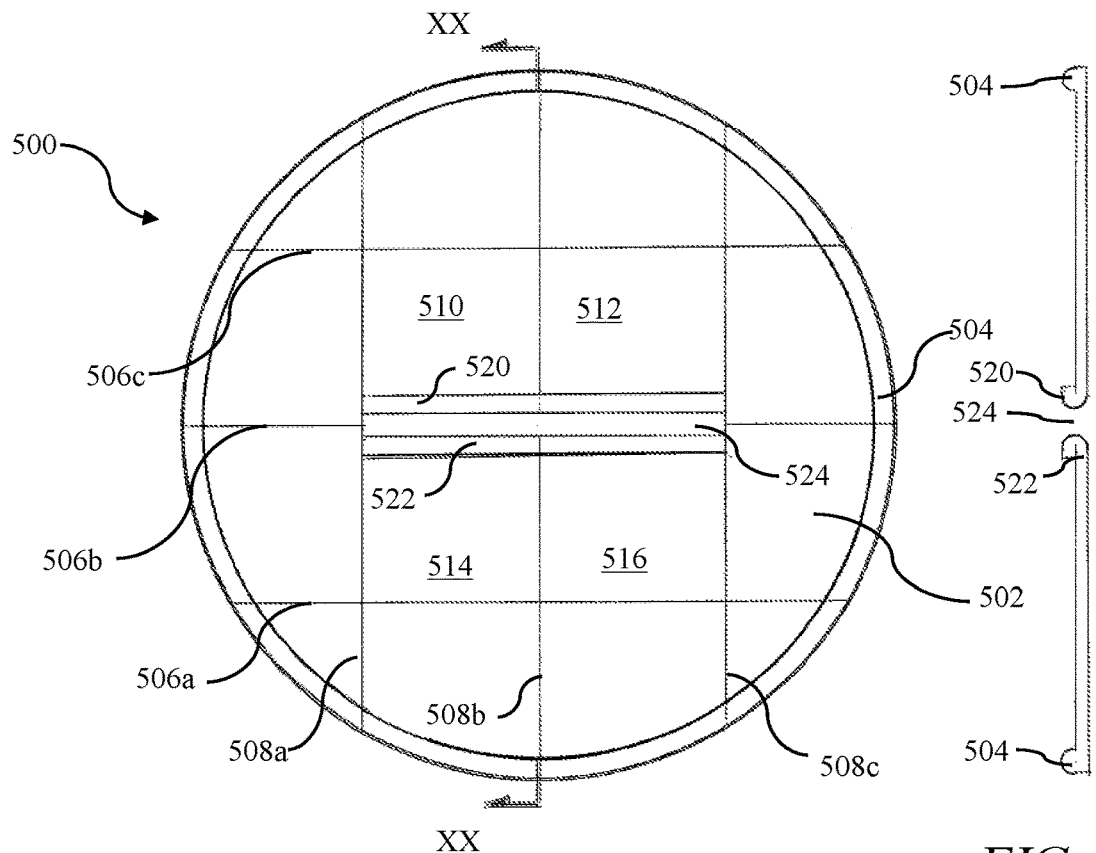
FIG. 19
FIG. 20
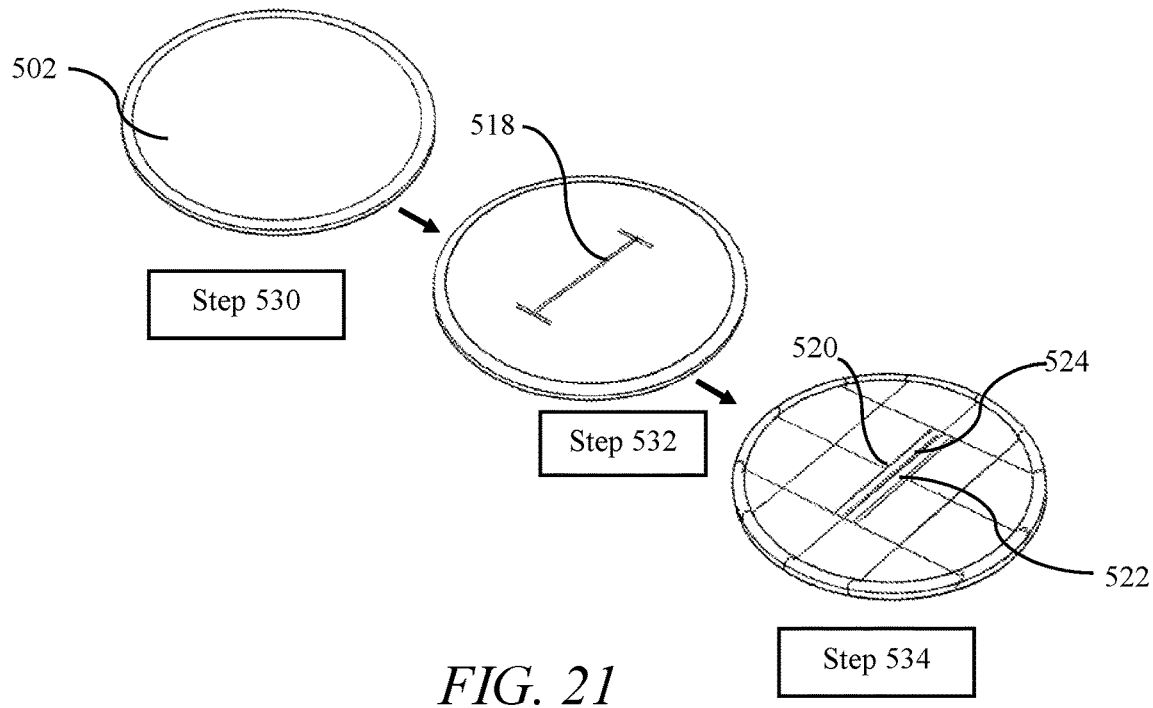
FIG. 21

PIZZA HAVING ENHANCED STRUCTURE AND CONSUMABILITY WHEREIN ADDITIONAL DOUGH CRUST CONFIGURATIONS ARE ACCOMPLISHED BY FORMING, ADDING OR MASKING

TECHNICAL FIELD

The present invention relates to revising the typical configuration of the crust of a typical pizza or baked goods such as pies, quiches and other like goods by exposing, forming, masking, and/or adding dough that enhances the structure of individual pieces, thereby producing pieces that are more easily consumed while maintain the desired non-compartmentalized area of the overall substrate. More specifically, such revised configurations enable producing isolated and exposed dough crust to the inside area, i.e., within the perimeter, of pizza and other baked goods, such that each piece cut from the pizza or other baked good has at least one edge having exposed crust thereon.

BACKGROUND

Pizza makes up roughly 10% of the food industry global market, totaling about $155 billion in global gross revenue annually, with $47 billion dollars just in the U.S. Indeed, pizza is a very popular food consumable and has evolved into may product offerings, including deep dish and thin crust, which is either typically "pie-sliced" or "square-cut," using industry terminology.

In a traditional (i.e., round-shaped) "pie-sliced" pizza, the pizza typically has cut lines that run from edge to edge through the center of the pizza, thereby forming roughly triangular or wedge-shaped slices, albeit with the outer edge, or crust, defined by the curve of the outside pizza shape. In a typical "square-cut" pizza, the round pizza is typically cut in a grid pattern, with cut lines running straight across (horizontally or laterally, when viewing from above) the pizza and other cut lines running up and down (vertically or longitudinally, when viewing from above) such that the lateral and longitudinal cut lines are disposed at roughly 90 degree angles to each other. The square-cut pizza creates pizza pieces that are roughly square or rectangular in shape, except for those around the perimeter that have part of their edges defined by the round outside pizza shape. Of course, pizzas may be in the form of other shapes besides round; indeed, pizzas may also be square, rectangular or any other geometric shape. Moreover, pizzas may also be cut in other non-traditional configurations, wherein cut lines may form other piece shapes besides the typical "pie-sliced" or "square-cut" pieces, as discussed above.

The typical "crust" of the pizza is the relatively harder outer perimeter of the pizza. This part of the pizza typically contains no sauce or other ingredients (although this part of the pizza may contain certain other ingredients, such as salt or other spices, melted butter, or other like ingredients) and may be generally thicker relative to the parts of the pizza dough that are covered by ingredients. Indeed, some pizzas include ingredients baked within the crust, such as cheese, for example. Because of this, crust may often be somewhat larger in height compared to the rest of the pizza and because it is free of ingredients is often used by individuals to grab the same with their fingers. Thus, the crust often serves as a "handle" for a pizza slice. On a pie-sliced pizza, each pizza slice contains a crust on the outer edge of each pizza slice. However, on a square cut pizza, only the squarish or mostly rectangular outer pieces on the outside perimeter of the pizza have a crust of some form. None of the square or rectangular center pieces (i.e., those not on the outside perimeter of the pizza) have a crust on an outer edge.

On a recent survey of more than 214,000 people, over 80% of consumers prefer the crust pieces over the center pieces, likely because pieces are generally easier to hold and eat without getting ingredients, such as sauce and toppings, on consumers' hands. Also, the pieces having a crust on at least one edge thereof are structurally relatively harder and/or stiffer than the remainder of the pizza dough covered by ingredients and form a structure that typically prevent the piece from becoming limp or soggy.

There have been many attempts to innovate pizza and it is widely accepted that innovation or differentiation drives new pizza sales. Some of these innovations and differentiators have included: cheese-stuffed crusts, rising dough crusts, wafer thin dough crust, rectangular-shaped pizzas, flat bread pizzas, New York-style dough crust, pizza without exposed dough crust (so-called "The Edge Pizza®"), deep dish butter crust dough, and various other varieties and combinations of cheese and toppings. There is no current innovation that ensures that each piece of a square-cut pizza (or other non-traditionally cut pizza) includes a crust on at least a portion of an outer edge thereof.

A need, therefore, exists for an improved baked good, specifically a pizza. Specifically, a need exists for an improved pizza that provides consumers with the ability to easily take and handle a pizza piece or slice. More specifically, a need exists for an improved pizza wherein every piece cut from the pizza includes at least one edge having at least a partial crust thereon.

Prior pizza innovations include providing additional crust that runs from one edge of a pizza to another to provide separate areas for ingredients thereby preventing ingredients from encroaching into other discrete areas. However, a pizza made with such additional crust is difficult to add ingredients to, such as sauces, cheese, and other like ingredients, as the additional crust interferes with the easy and efficient provision of the ingredients to the pizza substrate.

Therefore, a need exists for improved methods and apparatuses for adding pizza dough on top of pizzas. Specifically, a need exists for improved methods and apparatuses for providing strips of pizza dough in discrete locations on the top of the pizza substrate, such that slicing the pizza through the strips of such additional pizza dough provides a pizza whereby every piece includes at least one edge having at least a partial crust thereon. Moreover, a need exists for improved methods and apparatuses for forming additional crust and minimizing difficulty in adding ingredients thereto.

In addition, a need exists for improved methods and apparatuses for cutting raw pizza dough in discrete locations after the pizza dough is spread as a circle or rectangle. Moreover, a need exists for improved methods and apparatuses for folding cut pizza dough in the discrete locations to create a crust, such that each piece cut from the pizza includes at least one edge having at least a partial crust thereon.

SUMMARY OF THE INVENTION

The present invention relates to revising the typical configuration of the crust of a typical pizza or baked goods such as pies, quiches and other like goods by exposing, forming, masking, and/or adding dough that enhances the structure of individual pieces, thereby producing pieces that are more easily consumed while maintain the desired non-compartmentalized area of the overall substrate. More specifically, such revised configurations enable producing isolated and exposed dough crust to the inside area, i.e., within the perimeter, of pizza and other baked goods, such that each piece cut from the pizza or other baked good has at least one edge having exposed crust thereon.

To this end, in an embodiment of the present invention, a pizza is provided. The pizza comprises: a dough substrate comprising a perimeter and a flat sheet portion, the dough substrate comprising a first crust portion around the perimeter; an isolated area of exposed dough within the perimeter of the dough substrate forming a second crust portion; at least one ingredient covering the dough substrate; and a cut line in the dough substrate running longitudinally through the second crust portion, such that a first piece of the plurality of pieces within the perimeter of the dough substrate comprises at least the first crust portion and a second piece of the plurality of pieces within the perimeter of the dough substrate comprises at least the second crust portion.

In an embodiment, the isolated area of exposed dough comprises a thickness greater than the thickness of the flat sheet portion.

In an embodiment, the isolated area of exposed dough comprises a depression running longitudinally therein from a first end to a second end thereof.

In an embodiment, the isolated area of exposed dough is formed by adding dough to the dough substrate.

In an embodiment, the dough added to the dough substrate comprises a depression running longitudinally therein from a first end of the dough to a second end of the dough, wherein the cut line runs through the depression.

In an embodiment, each of the plurality of pieces within the perimeter of the dough substrate comprises at least one of the first crust portion and the second crust portion.

In an embodiment, the isolated area of exposed dough is formed by cutting the flat sheet portion into at least one flap and folding the at least one flap onto the dough substrate.

In an embodiment, the isolated area of exposed dough comprises a height higher than the flat sheet portion.

In an embodiment, the area of exposed dough is formed by adding the dough substrate to a pan having a forming element that raises a portion of the flat sheet portion of the dough substrate when disposed thereon, wherein the portion of the flat sheet portion raised by the forming element of the pan forms the isolated area of exposed dough.

In an embodiment, the isolated area of exposed dough is formed by masking an area within the perimeter of the dough substrate with a cover, adding the at least one ingredient to the dough substrate except in the area, and removing the cover to expose the isolated area of exposed dough.

In an embodiment, the pizza comprises a plurality of additional cut lines.

In an alternate embodiment of the present invention, a method of forming a pizza is provided. The method comprises the steps of: forming a dough substrate comprising a perimeter and a flat sheet portion, the dough substrate comprising a first crust portion around the perimeter thereof; forming an isolated area of exposed dough within the perimeter of the dough substrate forming a second crust portion within the perimeter of the dough substrate; adding at least one ingredient to cover the dough substrate except in the area of exposed dough; baking the dough substrate having the area of exposed dough and the at least one ingredient thereon; cutting the dough substrate to form a first cut line, wherein the first cut line runs longitudinally through the second crust portion; and cutting the dough substrate to form a second cut line, wherein the first cut line and the second cut line form a plurality of pieces, wherein a first piece of the plurality of pieces within the perimeter of the dough substrate comprises at least the first crust portion and a second piece of the plurality of pieces within the perimeter of the dough substrate comprises at least the second crust portion.

In an embodiment, the isolated area of exposed dough comprises a thickness greater than the thickness of the flat sheet portion.

In an embodiment, the method comprises the step of: adding dough to the dough substrate to form the isolated area of exposed dough.

In an embodiment, the method comprises the step of: forming a depression running longitudinally within the dough added to the dough substrate from a first end of the dough strip to a second end of the dough strip, wherein the first cut line runs through the depression.

In an embodiment, each of the plurality of pieces comprises at least one of the first crust portion and the second crust portion.

In an embodiment, the method comprises the steps of: cutting the flat sheet portion into at least one flap; and folding the at least one flap onto the dough substrate to form the isolated area of exposed dough.

In an embodiment, the isolated area of exposed dough comprises a height higher than the flat sheet portion.

In an embodiment, the method comprises the step of: adding the dough substrate to a pan having a forming element that raises a portion of the flat sheet portion of the dough substrate, wherein the portion of the flat sheet portion raised by the forming element of the pan forms the area of exposed dough.

In an embodiment, the method further comprises the steps of: masking an area of the dough substrate with a cover; adding the at least one ingredient to the dough substrate except in the area isolated by the cover; and removing the cover to expose the isolated area of exposed dough.

It is, therefore, an advantage and objective of the present invention to provide an improved pizza.

Specifically, it is an advantage and objective of the present invention to provide an improved pizza that provides consumers with the ability to easily take and handle a pizza piece or slice.

More specifically, it is an advantage and objective of the present invention to provide an improved pizza wherein every piece cut from the pizza includes at least one edge having at least a partial crust thereon.

Moreover, it is an advantage and objective of the present invention to provide improved methods and apparatuses for adding pizza dough on top of pizzas.

Specifically, it is an advantage and objective of the present invention to provide improved methods apparatuses for providing strips of pizza dough in discrete locations on the top of the pizza, such that slicing the pizza through the strips of pizza dough provides a pizza whereby every piece includes at least one edge having at least a partial crust thereon.

In addition, it is an advantage and objective of the present invention to provide improved methods and apparatuses for cutting raw pizza dough in discrete locations after the pizza dough is spread as a circle.

Moreover, it is an advantage and objective of the present invention to provide improved methods and apparatuses for folding cut pizza dough in the discrete locations to create a crust, such that each piece cut from the pizza includes at least one edge having at least a partial crust thereon.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 1 illustrates a top plan view of a round pizza having an added dough crust in an embodiment of the present invention.

FIG. 2 illustrates a cross-sectional view of a round pizza having an added dough crust of FIG. 1 along lines II-II in an embodiment of the present invention.

FIGS. 8A-8E illustrate embodiments of pizza dough strip cutting and/or forming apparatuses in embodiments of the present invention.

FIG. 9 illustrates a perspective view of a pizza dough strip cutting and/forming apparatus in an embodiment of the present invention.

FIG. 10 illustrates a cross-sectional view of a pizza dough strip cutting and/or forming apparatus along line X-X in FIG. 9 in an embodiment of the present invention.

FIG. 11 illustrates a perspective view of a pizza dough strip cutting and/or forming apparatus in an embodiment of the present invention.

FIG. 12 illustrates a perspective view of a pizza dough strip cutting and/or forming apparatus in an embodiment of the present invention.

FIGS. 13A and 13B illustrate perspective views of pizza dough strip cutting and/or forming apparatuses in embodiments of the present invention.

FIG. 14A-14B illustrate perspective and cross-sectional views, respectively, of a pizza dough strip roller press apparatus in an embodiment of the present invention.

FIG. 15 illustrates a perspective view of a pizza dough strip extrusion gun apparatus in an embodiment of the present invention.

FIG. 19 illustrates a top plan view of a round pizza having folded dough flaps in an embodiment of the present invention.

FIG. 20 illustrates a cross-sectional view of a pizza having folded dough flaps along line XX-XX in FIG. 19 in an embodiment of the present invention.

FIG. 21 illustrates a method for creating folded dough flaps on a round pizza in an embodiment of the present invention.

DETAILED DESCRIPTION OF THE PRESENTLY PREFERRED EMBODIMENTS

Figure 3:
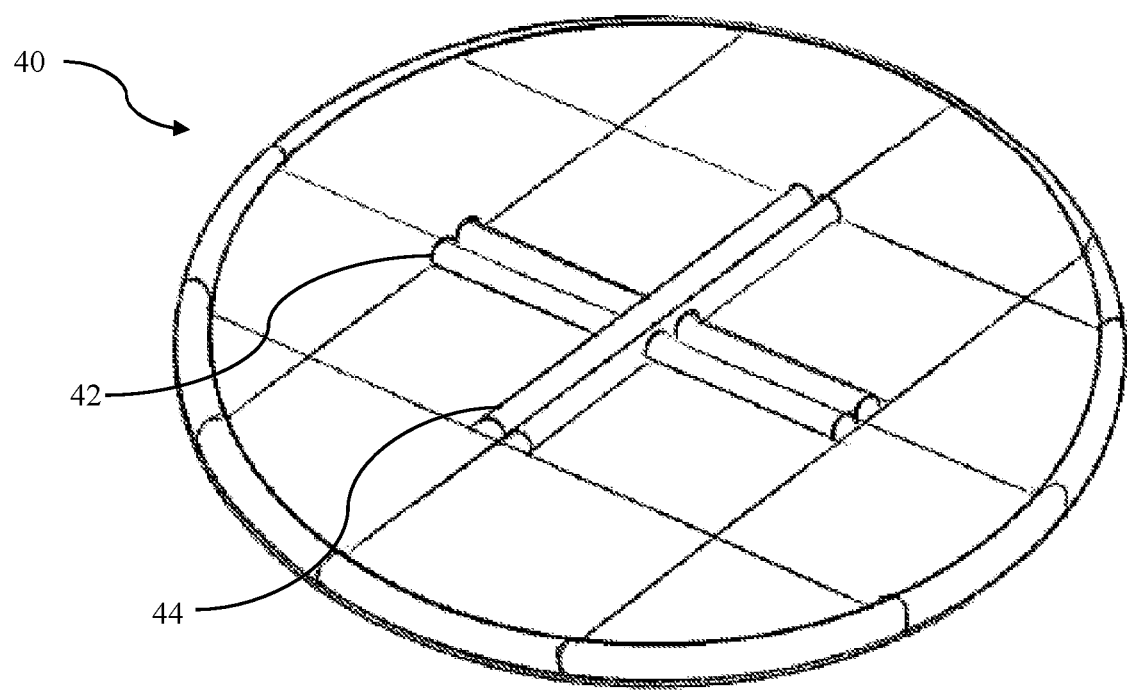
FIG. 3 illustrates a perspective view of a round pizza having added dough crust in an "x" or a "+" configuration in an embodiment of the present invention.

The present invention relates to revising the typical configuration of the crust of a typical pizza or baked goods such as pies, quiches and other like goods by exposing, forming, masking, and/or adding dough that enhances the structure of individual pieces, thereby producing pieces that are more easily consumed while maintain the desired non-compartmentalized area of the overall substrate. More specifically, such revised configurations enable producing isolated and exposed dough crust to the inside area, i.e., within the perimeter, of pizza and other baked goods, such that each piece cut from the pizza or other baked good has at least one edge having exposed crust thereon.

Now referring to the figures, wherein like numerals refer to like parts, FIG. 1 illustrates a top plan view of a round or "standard" dough template pizza 10 in an embodiment of the present invention. Although the present invention is illustrated and described with reference to a round or so-called "standard" dough template, it should be noted that the embodiments described herein may also apply to pizzas having other shapes, such as square, rectangular, or other geometric shapes, and should not be limited as described herein. Specifically, the pizza 10 comprises a planar disk-shaped dough substrate 12, which may be referred as a bottom crust, and a ring of dough forming an outer crust 14 on outer circumference of the pizza 10. The disk-shaped dough substrate 12 forms a base on which a pizza maker typically adds ingredients, such as sauces, vegetables, meats, fish, cheeses, or other like ingredients. The outer crust 14 typically is formed as a bead or ridge of dough and remains uncovered by any ingredients. The outer crust 14, when baked, typically becomes relatively rigid or stiff compared to the disk-shaped dough substrate 12, especially since the outer crust 14 is typically thicker than the disk-shaped dough substrate 12. As described herein, the outer crust 14 may provide a harder or stiffer support structure, which may be more easily grasped by a consumer thereof for picking up a slice or piece of the pizza 10 with his or her fingers.

FIG. 1 further illustrates horizontal or lateral cut lines 16a, 16b, 16c, and vertical cut lines 18a, 18b, 18c, when looking down on the pizza 10 from above. The horizontal cut lines 16a-16c run roughly parallel to each other across the face of the pizza from right to left or left to right. Vertical or longitudinal cut lines 18a-18c run roughly parallel to each other across the face of the pizza from a top of the pizza 10 to the bottom of the pizza 10, when looking from above. Thus, the lateral cut lines 16a-16c may cross the longitudinal cut lines 18a-18c at roughly perpendicular angles thereto. When cutting the pizza 10 in such a configuration, pieces formed by the cut lines are generally square or rectangular in shape, except for those pieces along the outer circumference thereof, which may have a side or edge that is curved because the curved side is an outer edge of the round pizza 10.

The embodiments of the present invention presented herein describe a so-called "square-cut" pizza, in that the dough substrate comprises a first set of cut lines running roughly parallel to each other and a second set of cut lines running roughly parallel to each other and roughly perpendicular to the first set of cut lines. It should be noted, however, that the present invention also covers other arrangement of cut lines, such as, for example, non-traditional cut lines, wherein the cut lines are not roughly parallel and/or perpendicular to each other, and the present invention should not be limited as shown and described herein.

In a typical square cut pizza 10, as illustrated in FIG. 1, center pieces 20, 22, 24, 26 typically do not include any outer edge having an outer crust. In the present invention, however, an added dough strip 30 may be added to a portion of the planar disk-shaped dough substrate 12 such that cutting through centrally and longitudinally through the added dough strip 30 may cause each of the center pieces 20, 22, 24, 26 to each have an outer crust, making each of the center pieces 20, 22, 24, 26 more easily grasped by a consumer thereof by his or her fingers.

The dough strip 30 may be added to the planar disk-shaped dough substrate 12 prior to the placement of ingredients thereon such that the dough strip 30 may become attached to the dough substrate 12. Preferably, the dough strip 30 may be adhered to the dough substrate 12 by adding the same and applying a pressure to the dough strip 30 onto the dough substrate 12. In addition, preferably no further materials may be added to adhere the dough strip 30 to the dough substrate 12; however, use of a binding agent, such as water, butter, oil, or other like material may be used if necessary.

The dough strip 30, and other areas of isolated and/or exposed dough crust described in the various embodiments described herein, whether created by adding dough, forming dough, covering dough, or created via any other means, may be referred to herein as "exposed," meaning that the dough crust contains no or limited traditional pizza toppings so as to be relatively clear of the same. This may thus allow a consumer to more easily grasp the same without getting ingredients on his or her hands that may be relatively messy. However, the exposed dough may contain certain ingredients that would not typically interfere with a consumer grasping the same with his or her hands, such as spices, melted butter, or other like ingredients. Thus, the dough strip 30 and other like exposed dough described herein may be considered "exposed" even if the dough contains other ingredients added thereto, as described herein.

The dough strip 30 may be any shape, size, or thickness. For example, the dough strip 30 may from a single mound running longitudinally. Preferably, however, the dough strip 30 may have a first mound 32 and a second mound 34 with a depressed valley, detent, or depression 36 therebetween, forming a dual mound dough strip running longitudinally, as illustrated in FIG. 2, a cross-sectional view of the pizza 10 along lines II-II. The dough strip 30, as shown in FIGS. 1 and 2 having the dual mounds, may make it easier for a pizza cutter to align and cut the dough strip 30 along its length, providing a guide for the pizza cutter. In addition, the dual mound, after being cut along the valley, detent, or depression 36, may provide a raised ridge on each piece separated by the cut line running therethrough, allowing a consumer to more easily grasp the same. Preferably, the dough strip 30 may be shaped and sized to form a graspable outer crust on each piece of the pizza 10 but may be relatively small in thickness so as not to take up too much area on the pizza 10 so that the pizza 10 remains mostly full of ingredients.

Therefore, when the pizza 10 is cut by a pizza cutter forming cut lines 16a, 16b, 16c and 18a, 18b, 18c, the cut line 16b may therefore cut the dough strip 30 in half longitudinally, and consequently every pizza piece formed thereby will have an outer crust covering at least a portion of one outer edge of each pizza piece.

Figure 4:
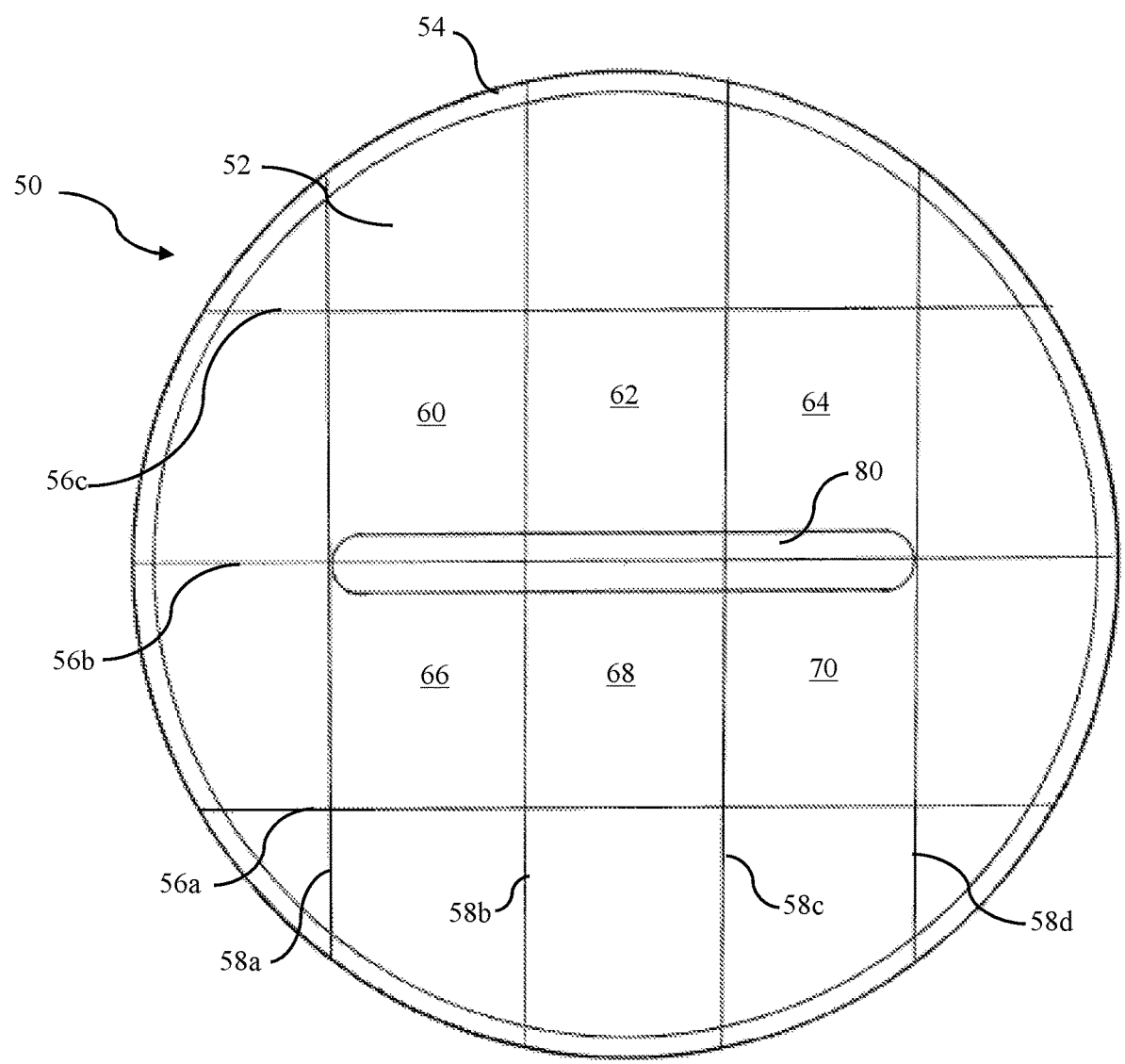
FIG. 4 illustrates a top plan view of a round pizza having an added dough crust in an alternate embodiment of the present invention.

As illustrated in FIG. 1, the dough strip 30 may have a top plan view wherein the outer edges thereof are rectangular in shape. As noted above, however, the dough strip 30 may be any shape; for example, FIG. 4 illustrates a dough strip 80 that is oval in shape, having rounded corners. Moreover, FIG. 1 illustrates that the dough strip 30 runs along cut line 16b completely from the first vertical cut line 18a to the third vertical cut line 18c, which provides an outer crust along an entirety of one edge of the center pieces 20, 22, 24, 26. However, it should be noted that the dough strip 30 may run only partially across the outer edge of each center piece, not running completely between the first vertical line 18a and the third vertical line 18b. Moreover, the dough strip 30 is illustrated as being continuous; it should be noted that dough strip 30 may be formed from separate pieces of dough that are separate from each other but form a discontinuous line across the pizza 10. The discontinuous dough strip may, however, ensure that a portion of exposed added crust is disposed on each piece of the pizza 10. Thus, at least a portion of one outer edge of each of the center pieces 20, 22, 24, 26 may have an outer crust thereon, and the present invention should not be limited as described herein.

FIG. 3 illustrates an alternate embodiment of the present invention, of a pizza 40 having an arrangement of dough strips 42, 44 in a "X" or "+" pattern, providing first exposed added crust and second exposed added crust running into two directions, namely perpendicular to each other to provide outer crust to additional pieces.

FIG. 4 illustrates an alternate embodiment of the present invention, of a pizza 50 comprising a planar disk-shaped dough substrate 52 (i.e., a "bottom crust"), and a ring of dough forming an outer crust 54 on an outer circumference of the pizza 50.

FIG. 4 further illustrates horizontal or lateral cut lines 56a, 56b, 56c, and vertical or longitudinal cut lines 58a, 58b, 58c, 58d (when looking down on the pizza 50 from above). The lateral cut lines 56a-56c run roughly parallel to each other across the face of the pizza from right to left or left to right. The longitudinal cut lines 18a-18d run roughly parallel to each other across the face of the pizza from a top of the pizza 50 to the bottom of the pizza 50, or vice versa, when looking from above. Thus, the lateral cut lines 56a-56c may cross the longitudinal cut lines 58a-58d at roughly right angles thereto. When cutting the pizza 50 in such a configuration, pieces formed by the cut lines are generally square or rectangular in shape, except for those pieces along the outer circumference thereof, which may have a side that is curved because the curved side is an outer edge of the round pizza 50.

In a typical square cut pizza 50, as illustrated in FIG. 4, center pieces 60, 62, 64, 66, 68, 70 typically do not include any outer edge having an outer crust. In the present invention, however, an added dough strip 80 may be added to a portion of the planar disk-shaped dough substrate 52 such that cutting through centrally and length-wise through the added dough strip 80 may cause each of the center pieces 60, 62, 64, 66, 68, 70 to each have an outer crust, making each of the center pieces 60, 62, 64, 66, 68, 70 more easily grasped by a consumer thereof by his or her fingers.

The dough strip 80 may be added to the planar disk-shaped dough substrate 52 prior to the placement of ingredients thereon such that the dough strip 80 may become attached to the dough 52. Preferably, no further materials may be added to adhere the dough strip 80 to the dough 52; however, use of a binding agent, such as water, butter, oil, or other like material, may be used if necessary.

As with the dough strip 30, described above with reference to FIGS. 1 and 2, the dough strip 80 may be any shape, size, or thickness. While the dough strip 30 may have squared corners (as shown from above in FIG. 1), dough strip 80 may have rounded corners, as noted above. As with the dough strip 30, the dough strip 80 may from a single mound running longitudinally. Preferably, however, the dough strip 80 may be dual mounded, as described above, having a valley or depression therein. The dough strip 80 having the dual mounds may make it easier for a pizza cutter to align and cut the dough strip 80 lengthwise, providing a guide for the pizza cutter. In addition, the dual mounds, after being cut lengthwise, may also provide a raised ridge on each piece separated by the cut line running therethrough, allowing a consumer to more easily grasp the same. Preferably, the dough strip 80 may be shaped and sized to form a graspable outer crust on each piece of the pizza 50 but may be relatively small in thickness so as not to take up too much area on the pizza 50 so that the pizza 50 remains mostly full of ingredients.

Therefore, when the pizza 50 is cut by a pizza cutter forming cut lines 56a, 56b, 56c and 58a, 58b, 58c, 58d, the cut line 56b may therefore cut the dough strip 80 in half lengthwise and consequently every pizza piece formed thereby will have an outer crust covering at least a portion of one outer edge of each pizza piece.

Figure 5:
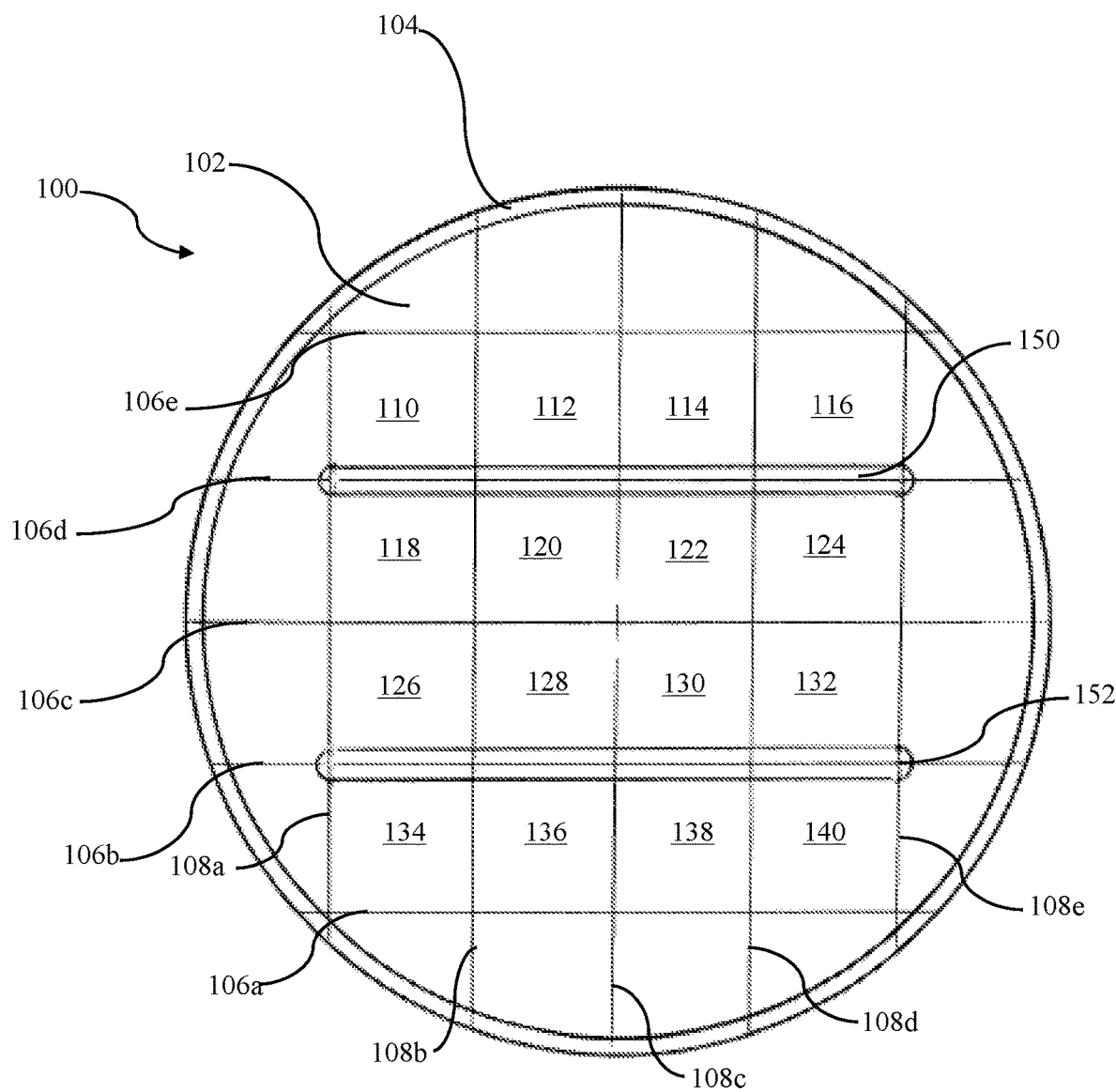
FIG. 5 illustrates a top plan view of a round pizza having a pair of added dough crusts in an alternate embodiment of the present invention.

FIG. 5 illustrates yet another embodiment of the present invention, of a pizza 100 comprising a planar disk-shaped dough substrate 102 (i.e., a "bottom crust"), and a ring of dough forming an outer crust 104 on outer circumference of the pizza 100.

FIG. 5 further illustrates horizontal or lateral cut lines 106a, 106b, 106c, 106d, 106e and vertical or longitudinal cut lines 108a, 108b, 108c, 108d, 108e (when looking down on the pizza 100 from above). The lateral cut lines 106a-106e run roughly parallel to each other across the face of the pizza 100 from right to left or left to right. The longitudinal cut lines 108a-108e run roughly parallel to each other across the face of the pizza from a top of the pizza 100 to the bottom of the pizza 100, or vice versa, when looking from above. Thus, the lateral cut lines 106a-106e may cross the longitudinal cut lines 108a-108e at roughly right angles thereto. When cutting the pizza 100 in such a configuration, pieces formed by the cut lines are generally square or rectangular in shape, except for those pieces along the outer circumference thereof, which may have a side that is curved because the curved side is an outer edge of the round pizza 100.

In a typical square cut pizza 100, as illustrated in FIG. 5, center pieces 110, 112, 114, 116, 118, 120, 122, 124, 126, 128, 130, 132, 134, 136, 140 typically do not include any outer edge having an outer crust. In the present invention, however, a first added dough strip 150 and a second added dough strip 152 may each be added to a portion of the planar disk-shaped dough substrate 102 such that cutting through centrally and lengthwise through the added dough strip 150 may cause the center pieces 110-140 to each have an outer crust, making each of the center pieces 110-140 more easily grasped by a consumer thereof by his or her fingers.

The dough strips 150, 152 may be added to the planar disk-shaped dough 102 prior to the placement of ingredients thereon such that the dough strips 150, 152 may become attached to the dough 102. Preferably, no further materials may be added to adhere the dough strips 150, 152 to the dough 112; however, use of a binding agent, such as water, butter, oil, or other like material, may be used if necessary.

Therefore, when the pizza 100 is cut by a pizza cutter forming cut lines 106a-106e and 108a-108e, the cut line 106b may therefore cut the dough strip 150 in half lengthwise, and the cut line 106d may cut the dough strip 152 in half lengthwise, and consequently every pizza piece formed thereby will have an outer crust covering at least a portion of one outer edge of each pizza piece.

Figure 6:
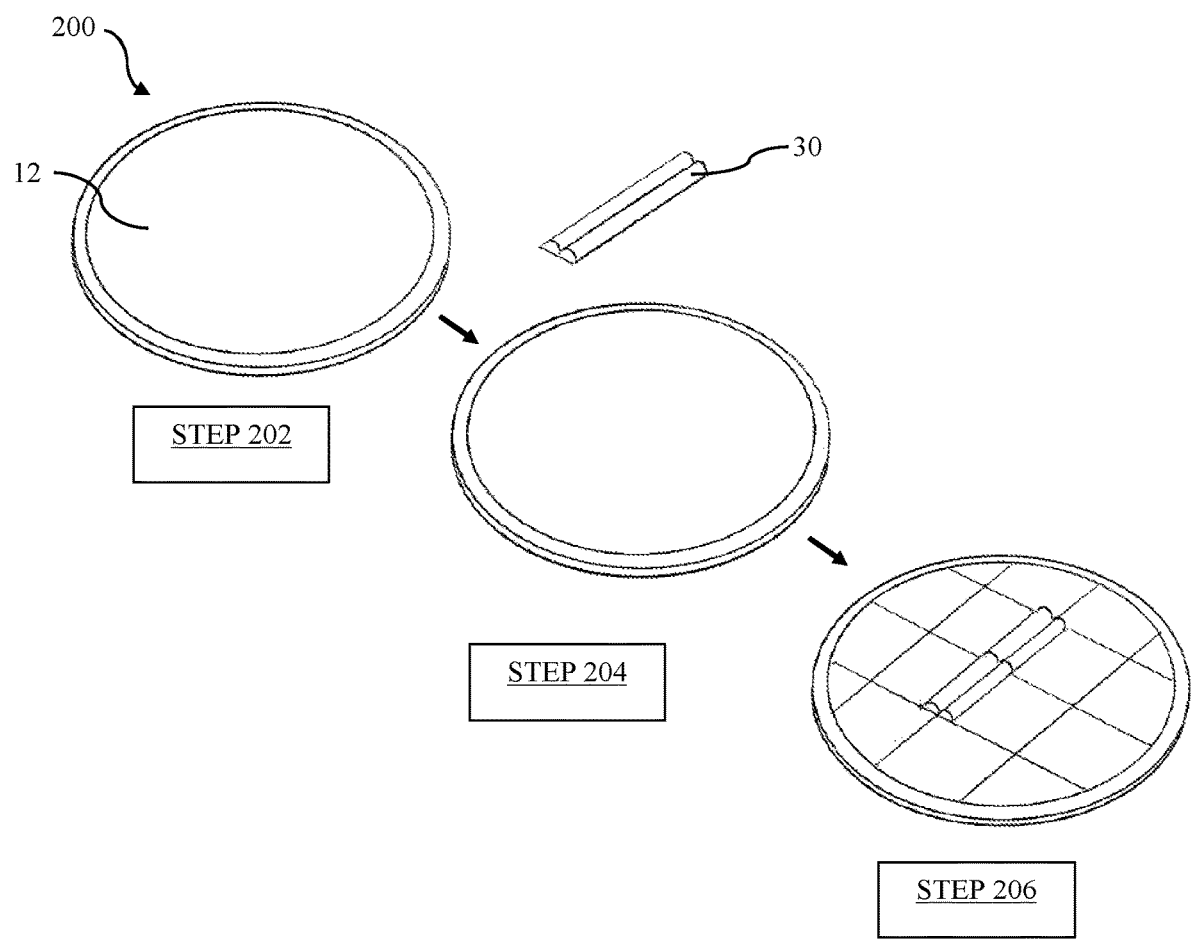
FIG. 6 illustrates a method for adding pizza dough crust to a round pizza in an embodiment of the present invention.
Figure 7A:
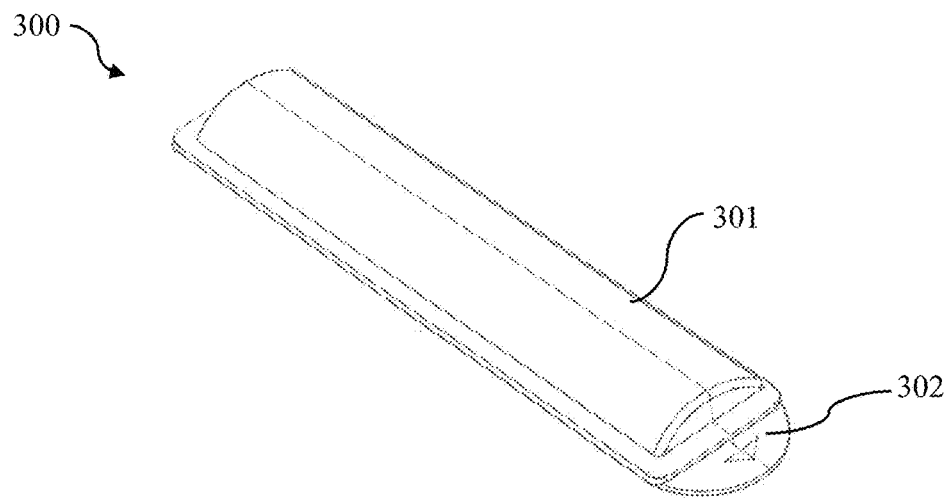
FIGS. 7A-7C illustrate perspective views of pizza dough strip making apparatuses in embodiments of the present invention.
Figure 7B:
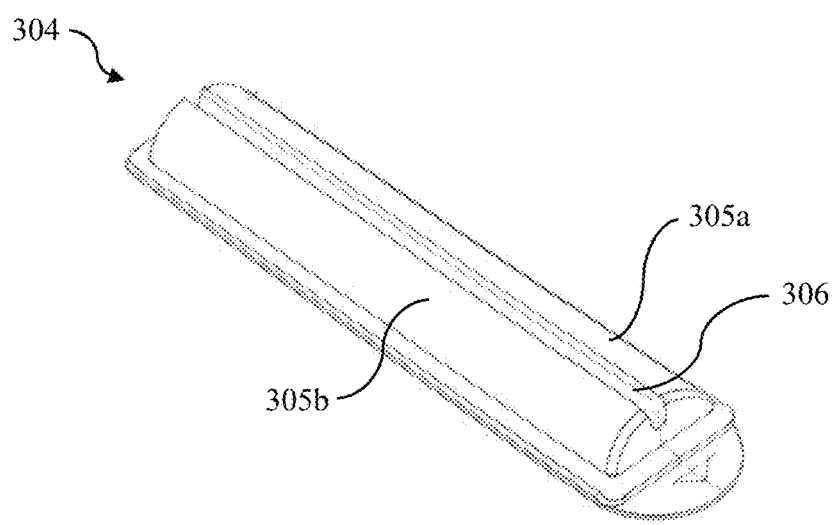
Figure 7C:
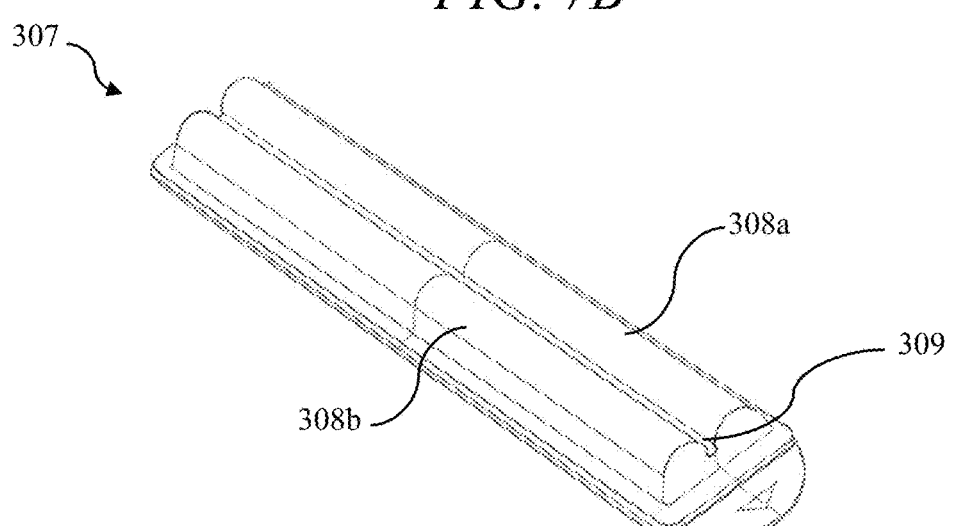

FIG. 6 illustrates an exemplary methodology for making a pizza 200, as described above with reference to FIGS. 1-3. In a first step 202, a standard round pizza template. In a second step 202, an added dough strip is disposed on a top face of the pizza in a location such that, after ingredients are placed thereon and after baking the same, the pizza is cut with lateral and longitudinal cut lines (when viewing from above), as in step 206, and the dough strip is consequently cut in half length-wise, thereby providing an outer crust to each piece of the pizza formed thereby.

FIGS. 7-16 illustrate various apparatuses that may be used to add dough strips to standard round pizza dough, as described above with reference to FIGS. 1-6. In one embodiment, an amount of pizza dough may be formed by hand into a strip and simply placed on the pizza dough prior to adding ingredients thereon. However, doing so by hand may be time-consuming and inconsistent. FIG. 7A illustrates an embodiment of a housing or shell 300 that forms a mold that may receive an amount of pizza dough therein and may therefore have a shape and size for the particular shape and size pizza dough strip needed to apply to the pizza. Specifically, the housing may have a mounded area 301 such that when placing pizza dough therein, the pizza dough may take the shape of the housing 300. A peel-off film 302 may be provided so that, when used the pizza maker may peel the peel-off film 302 and place the housing, pizza dough side down, on the standard round pizza dough substrate, and push the pizza dough strip therefrom onto the pizza dough substrate. Alternatively, as illustrated in FIGS. 7B and 7C, housings or shells 304, 307 are illustrated, each of which may form a mold that may receive an amount of pizza dough therein and may therefore have a shape and size for the particular shape and size pizza dough strip needed to apply to the pizza. Specifically, the housings or shells 304, 307 may each have mounded areas 305a, 305b and 308a, 308b, respectively, and each may further have a valley or depression element 306, 309, respectively, such that when placing pizza dough therein, the pizza dough may take the shape of the housings or shells 304, 307, respectively.

FIGS. 8A-8E illustrate various embodiments of pizza dough cutting and/or forming apparatuses. Specifically, in FIG. 8A, a pizza dough cutting and/or forming apparatus 310 may comprise walls forming a compartment 311 that may be pressed down into flat pizza dough, wherein the walls may have relatively sharp edges to cut the pizza dough. Subsequent removal of the pizza dough cutting and forming apparatus 310 may remove a dough strip from the flat pizza dough, which may remain inside the walls thereof in a dough strip space. Alternatively, the pizza dough cutting and/or forming apparatus 310 may have pizza dough added into the compartment 311, thereby forming the pizza dough strip. The pizza dough cutting and/or forming apparatus 310 may then be placed onto a standard round pizza dough substrate, wherein a hand press 312 may be pushed into the pizza dough cutting and/or forming apparatus 310, thereby pushing the dough strip from the pizza dough cutting and/or forming apparatus 310 onto the pizza dough substrate. The hand press 312 may further have a valley or depression forming tab 314 such that, when pressed into the dough strip, it may form a valley or depression in the dough strip.

Figures 8A, 8B:
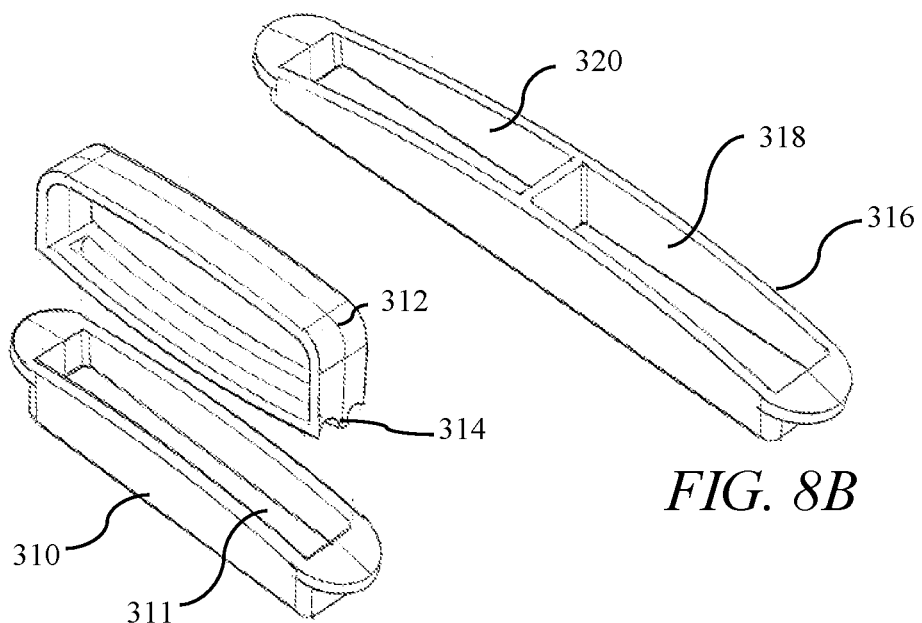

In a similar embodiment, FIG. 8B illustrates a dual pizza dough strip forming pizza dough cutting and/or forming apparatus 316 having a first compartment 318 and a second compartment 320 therein for forming two pizza dough strips. The pizza dough strips may be formed by cutting flat pizza dough therefrom or by adding pizza dough therein, as disclosed above with respect to FIG. 8A. Hand press 312 in FIG. 8A may be used to press the dough strips therefrom.

FIG. 8C illustrates a pizza dough strip forming apparatus 322 having a compartment 324 and extended arms 326, 328 that may be used to gauge against a round pizza dough substrate so that the center of the pizza can be located. For example, the length of the pizza dough cutter 322, including the compartment 324 and the arms 326, 328 may be the same size as the diameter of the pizza. The arms 326, 328 may have tabs 330, 332 that may be used to align with the edges of the pizza, which aligns the compartment 324 with the center of the pizza. Thus, the compartment 324 may be placed in the center of the pizza dough substrate, and a dough strip within the compartment 324 may be pushed via hand press 334. Flanges 325, 327 may extend from the compartment 324 for placement of the pizza dough strip forming apparatus 320 onto a flat pizza dough wherein the flanges 325, 327 may prevent cutting of the flat pizza dough so that a pizza strip added therein may be pressed onto the flat pizza dough via press hand press 334. As illustrated in FIG. 8D, a cross-sectional view of the pizza dough strip forming apparatus 320, the compartment 324 may have walls having beveled edges 329a, 329b wherein pressing of the pizza dough strip via the handle press 334 may form a mounded pizza dough strip with a valley or depression therein formed by the tab 331.

FIG. 8E illustrates a similar embodiment as FIG. 8C of a pizza cutting and/or forming apparatus 340 having an adjustable telescoping compartment 342 therein. Arms 344, 346 may be movable inwardly and outwardly, thereby decreasing or increasing the size of the compartment 342 therein, respectively. Therefore, the pizza cutter 340 may be used on differently sized pizzas.

FIGS. 9 and 10 illustrate a dough cutting and/or forming apparatus 350 that is similar to the dough cutting and/or forming apparatuses described above with reference to FIGS. 8A-8E, except the dough cutting and/or forming apparatus 350 may have a hand press 352 disposed within the dough cutting and/or forming apparatus 350 without removal therefrom, such that when a dough strip is disposed therein, the hand press 352 may simply de depressed thereby pushing the dough therefrom. The hand press 352 may be fixed within the cutter 350, and may be spring-loaded so that when released, it may spring back into its initial position. FIG. 10 illustrates a cross-sectional view along lines X-X showing the shape that the dough strip may take, including the valley or depression, when pressed from the cutting and/or forming apparatus 350 via the hand press 352.

FIG. 11 illustrates an alternate embodiment of a dough cutting and/or forming apparatus 360 having an integrally formed hand press 362 having a first living hinge 364 and a second living hinge 366, each of which may connect to the hand press 362 such that, when pressed, the hand press 362 may push the dough strip therefrom. The living hinges 364, 366 may further be leaf springs, and may spring back into place when released.

FIG. 12 illustrates an alternate embodiment of a dough cutting and/or forming apparatus 370 having an integrally formed hand press 372 having a flexible membrane or element 374 allowing the hand press 372 to be pushed into the dough cutter 370 and being resilient to allow the hand press 372 to return to its original position when released.

FIG. 13A illustrates a dough cutter 380 having a compartment 382 corresponding to a single mound dough strip and one or more stabilizing wings 384 that may be utilized for better placement and release of dough strips onto a pizza dough template, as described above. FIG. 13B illustrates a dough cutting and/or forming apparatus 386 having a compartment 388 corresponding to a dual mound dough strip. In an embodiment, the dough cutter or former 386 may merely form dough from the pizza substrate into a mound by pressing the same into the dough substrate.

FIGS. 14A-14B illustrate a roller press 390 having a handle 391 and a wheel 394 that allows a specific shape of a dough strip 392 to be created. As illustrated in the front view of FIG. 14B of the roller press 390, the wheel 394 may have a valley or depression forming element 397 and flanges 395, 396, which when pressed into a dough strip 392, may form a valley or depression 393 in the dough strip 392. Alternatively, circumferential edges of the roller press 390 may have relatively sharp edges instead of the flanges 395, 396 and may cut pizza dough when the roller press runs along a dough sheet, and the valley, detent, or depression forming element 397 may form the valley or depression into the resulting dough strip.

FIG. 15 illustrates a pizza dough extrusion gun apparatus 400 in an alternate embodiment of the present invention. The extrusion gun apparatus 400 may comprise a trigger 402, a compartment 404 to receive a pizza dough cartridge 406, and a plunger 408 which may be ratcheted into the compartment 404 to push pizza dough from the pizza dough cartridge 406 therein. A shaped nozzle 410, such as a flattened frustoconical nozzle, as illustrated in FIG. 14, may be utilized to spread a layer of a dough strip onto a round pizza template in the desired position.

Figure 16:
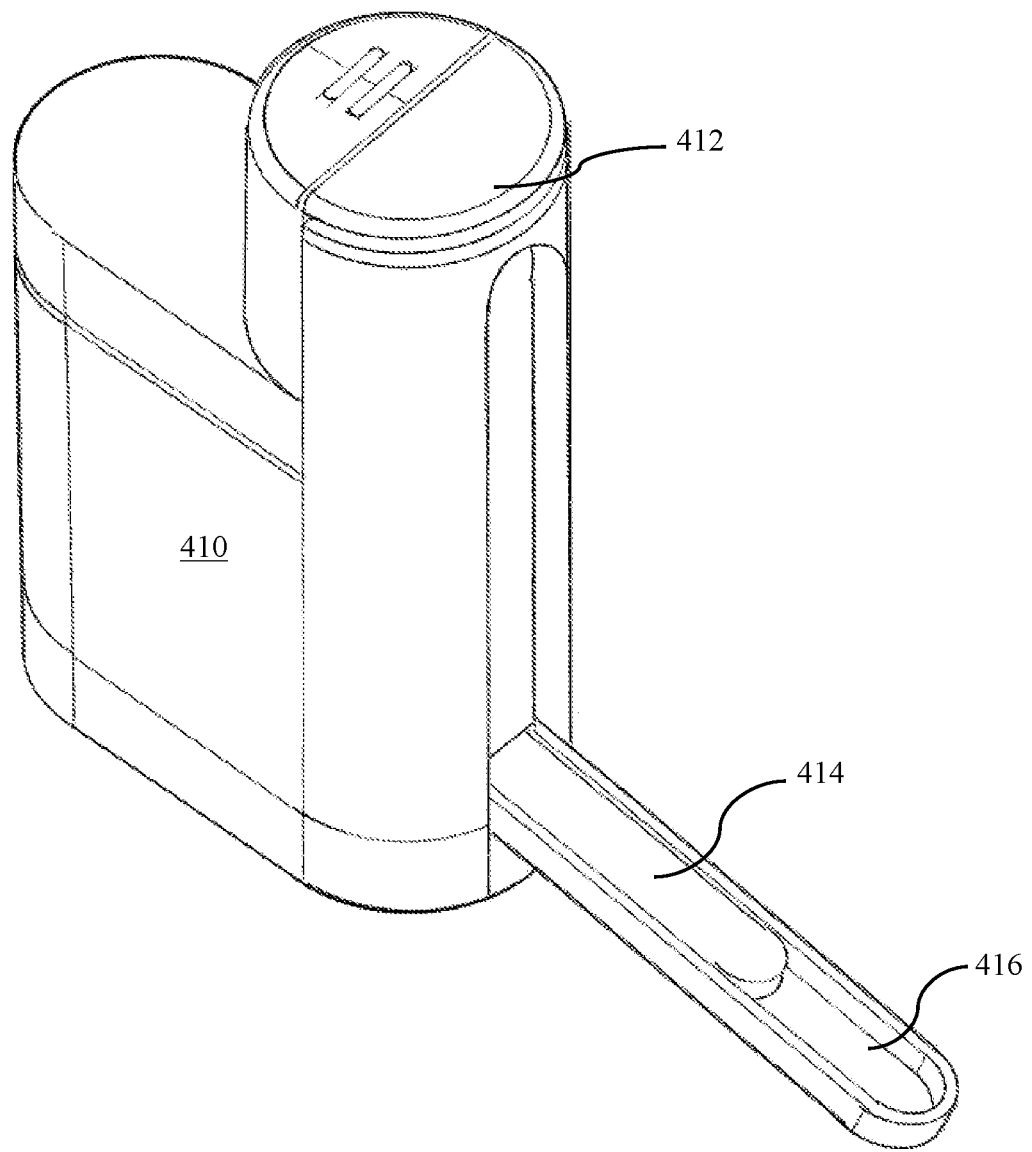
FIG. 16 illustrates a perspective view of a mechanical pizza dough strip extrusion apparatus in an embodiment of the present invention.

FIG. 16 illustrates a dough strip forming apparatus 410 in an alternate embodiment of the present invention. Specifically, the apparatus 410 may have a compartment therein having an amount of pizza dough. Pressing a button 412 may dispense a portion 414 of the pizza dough contained therein into a tray 416 having the proper shape and size of the desired dough strip. The apparatus 410 may be mechanical and/or electrical. Once dispensed, the tray 416 may be removed from the remainder of the apparatus 410 and the dough strip contained therein applied to a round pizza dough substrate, as described herein.

Figure 17:
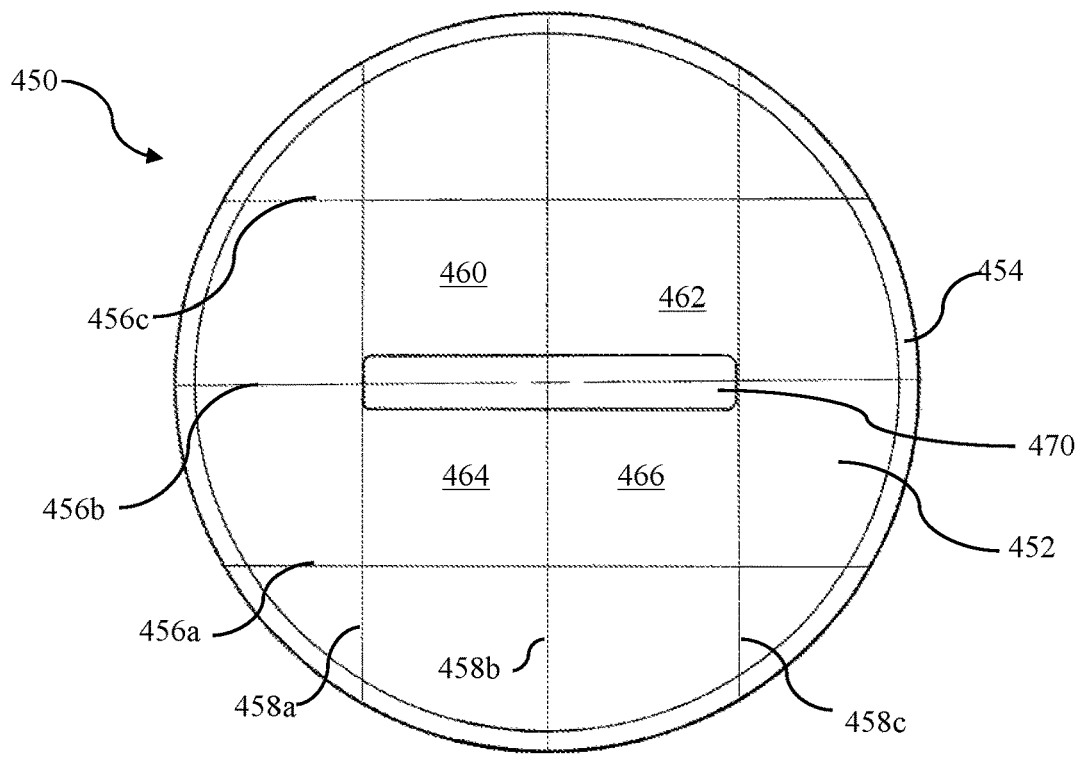
FIG. 17 illustrates a top plan view of a round pizza having an isolated dough area in an embodiment of the present invention.

FIG. 17 illustrates yet another alternate embodiment of the present invention of a pizza 450 comprising a planar disk-shaped dough substrate 452 (i.e., a "bottom crust"), and a ring of dough forming an outer crust 454 on an outer circumference of the pizza 450.

FIG. 17 further illustrates horizontal or lateral cut lines 456a, 456b, 456c, and vertical or longitudinal cut lines 458a, 458b, 458c (when looking down on the pizza 450 from above). The lateral cut lines 456a-456c run roughly parallel to each other across the face of the pizza from right to left or left to right. The longitudinal cut lines 458a-458d run roughly parallel to each other across the face of the pizza from a top of the pizza 450 to the bottom of the pizza 450, or vice versa, when looking from above. Thus, the lateral cut lines 456a-456c may cross the longitudinal cut lines 458a-458d at roughly right angles thereto. When cutting the pizza 450 in such a configuration, pieces formed by the cut lines are generally square or rectangular in shape, except for those pieces along the outer circumference thereof, which may have a side that is curved because the curved side is an outer edge of the round pizza 450.

Figure 18:
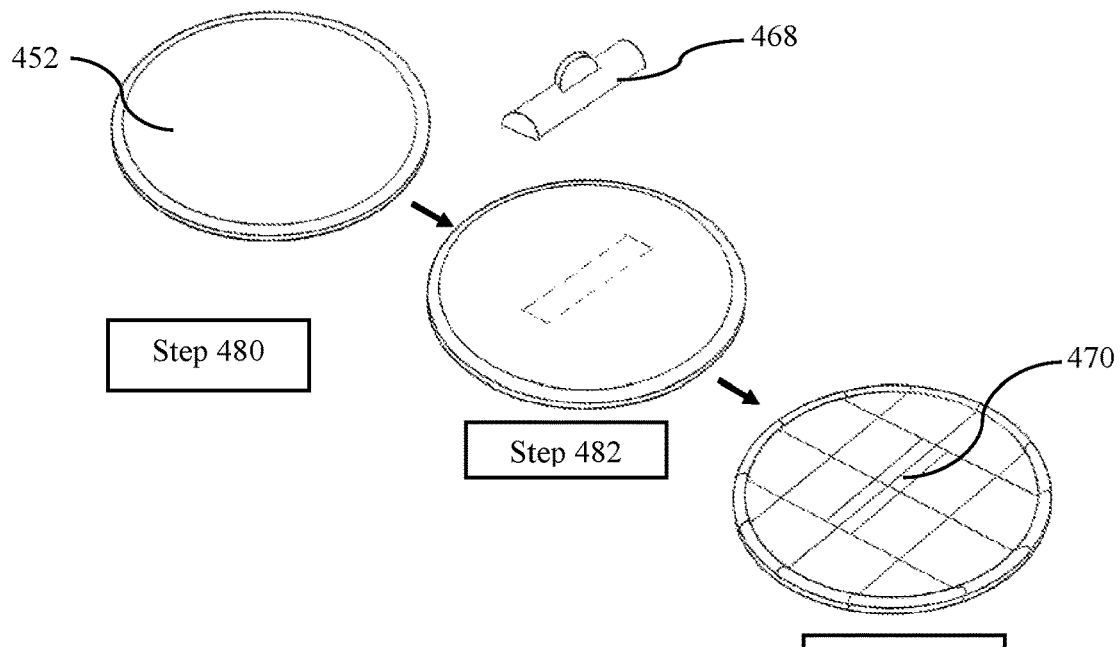
FIG. 18 illustrates a method for creating an isolated bare area on a round pizza in an embodiment of the present invention.

In a typical square cut pizza 450, as illustrated in FIG. 17, center pieces 460, 462, 464, 466, typically do not include any outer edge having an outer crust. In the present invention, in a first step 480 (as shown in FIG. 18), a round pizza planar disk-shaped pizza dough 452 with outer crust 454 is provided. In step 482, a cap 468 placed over a portion of the planar disk-shaped pizza dough 452 such that an exposed dough area 470 is created after ingredients are placed thereon to form exposed crust after baking, as illustrated in step 484. Although the bare area 470 is illustrated having squared corners, it should be noted that other shapes of bare areas may be imparted thereto and the present invention should not be limited as shown and described herein.

After baking, the bare area 470 thereby cause each of the center pieces 460, 462, 464, 466 to each have an outer crust and the center pieces 460, 462, 464, 466 may be more easily grasped by a consumer using his or her fingers or a spatula or the like.

FIG. 19 illustrates yet another alternate embodiment of the present invention of a pizza 500 comprising a planar disk-shaped dough substrate 502 (i.e., a "bottom crust"), and a ring of dough forming an outer crust 504 on an outer circumference of the pizza 500.

FIG. 19 further illustrates horizontal or lateral cut lines 506a, 506b, 506c, and vertical or longitudinal cut lines 508a, 508b, 508c (when looking down on the pizza 500 from above). The lateral cut lines 506a-506c run roughly parallel to each other across the face of the pizza from right to left or left to right. The longitudinal cut lines 508a-508d run roughly parallel to each other across the face of the pizza from a top of the pizza 500 to the bottom of the pizza 500, or vice versa, when looking from above. Thus, the lateral cut lines 506a-506c may cross the longitudinal cut lines 508a-508d at roughly right angles thereto. When cutting the pizza 500 in such a configuration, pieces formed by the cut lines are generally square or rectangular in shape, except for those pieces along the outer circumference thereof, which may have a side that is curved because the curved side is an outer edge of the round pizza 500.

In a typical square cut pizza 500, as illustrated in FIG. 19, center pieces 510, 512, 514, 516, typically do not include any outer edge having an outer crust. In the present invention, in a first step 530 (as shown in FIG. 21), a round pizza planar disk-shaped pizza dough 502 with outer crust 504 is provided. In step 532, a cut line 518 is cut into a portion of the planar disk-shaped pizza dough substrate 502 such that dough flaps 520, 522 are created which may then be folded over (as illustrated in step 534) to form exposed crust. FIG. 20 illustrates a cross-sectional view along lines XX-XX of FIG. 18 showing folded over dough flaps 520, 522. After folding the dough flaps 520, 522, a gap 524 may be formed between the folded dough flaps 520, 522. Although the dough flaps 520, 522 are illustrated having squared corners and a straight cut line 518, it should be noted that other cut lines may be cut thereinto to impart rounded corners and spaces making the grasping and folding of the flaps easier, and the present invention should not be limited as shown and described herein.

Ingredients may then be added to the pizza 500, avoiding the folded over dough flaps 520, 522, and the pizza 500 is baked, via step 534. The folded over dough flaps 520, 522 thereby cause each of the center pieces 510, 512, 514, 516 to each have an outer crust and, along with the gap 524 between the folded dough flaps 520, 522, the center pieces 510, 512, 514, 516 may be more easily grasped by a consumer using his or her fingers or a spatula or the like.

Figure 22:
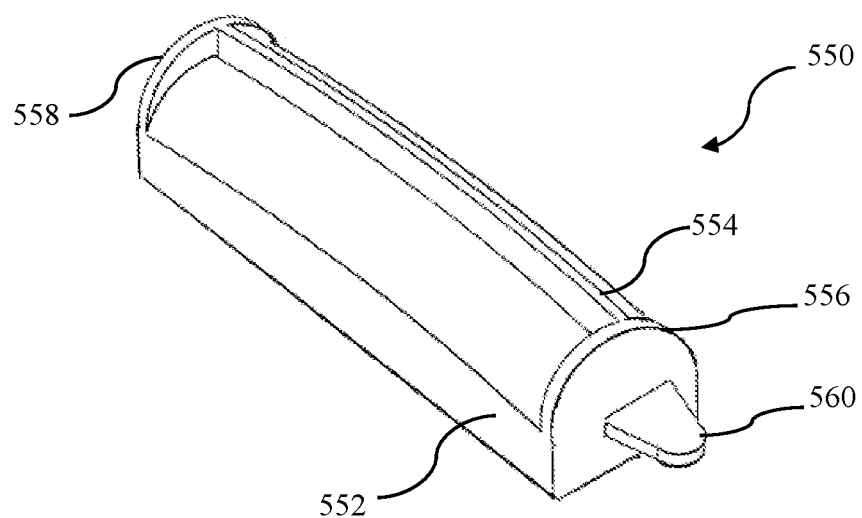
FIG. 22 illustrates a perspective view of a pizza dough cutting and/or covering tool in an embodiment of the present invention.

FIG. 22 illustrates a dough cutting and/or covering tool 550 in an embodiment of the present invention. The dough cutting and/or covering tool 550 comprises a body 552 with a dough cutting blade 524 disposed on a top of the body 552 and running longitudinally along the body 552. The cutting blade 524 may preferably allow for the cutting of pizza dough when pressed into the pizza dough, such as when the pizza dough is laid out as planar and disk-shaped. Perpendicular cutting blade extension elements 556, 558 may be disposed on opposite ends of the body 552 such that pressing and/or rolling the body 552 may not only cut the dough lengthwise, but also cut the ends thereof perpendicularly to form the dough flaps 520, 522 described above. A dough spread tab 560 may extend from the body, which may be used to get under the dough flaps to more easily fold them over, as described above. The body 552 may also cover the dough to form a bare area as described above with reference to FIGS. 17-18. Thus, the dough cutting and/or covering tool 550 may have dual functions: 1) cutting the fold flaps into pizza dough; and/or 2) covering the pizza dough to form bare areas.

Figure 23:
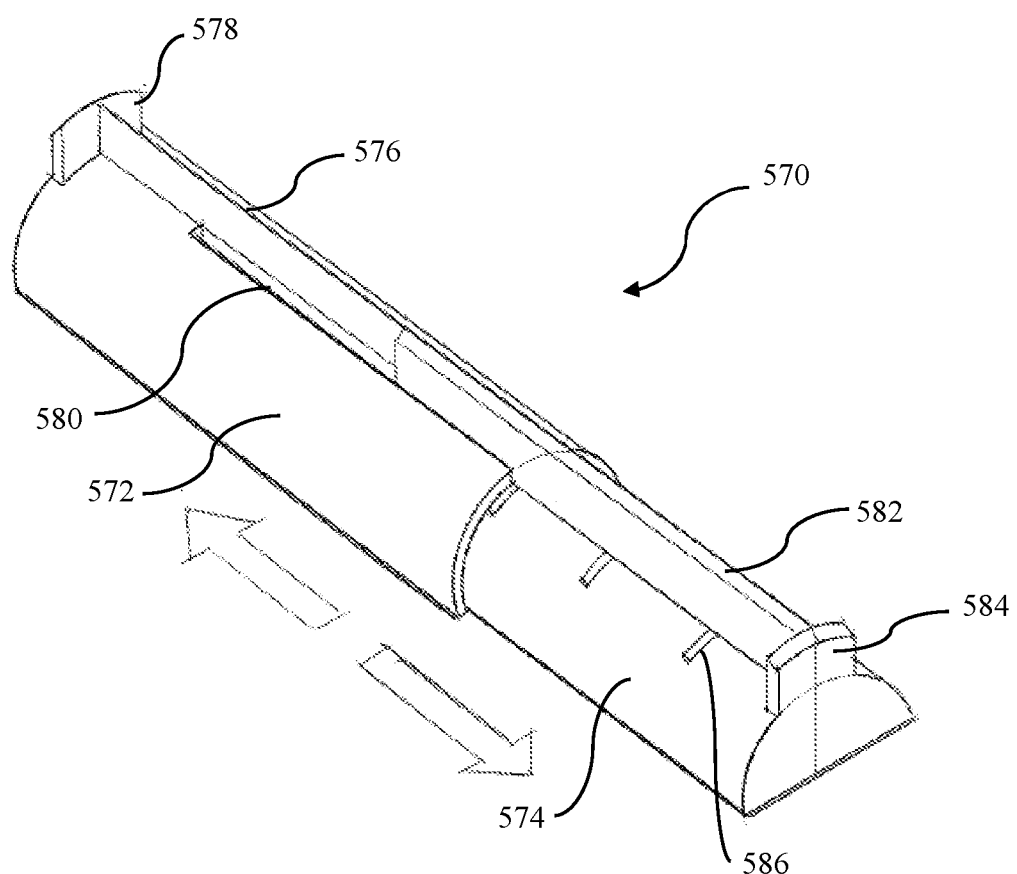
FIG. 23 illustrates a perspective view of a telescoping pizza dough cutting and/or covering tool in an embodiment of the present invention.

FIG. 23 illustrates a telescoping dough cutting and/or covering tool 570 in an alternate embodiment of the present invention. Specifically, the telescoping dough cutting and/or covering tool 570 comprises a first housing body 572 and a second housing body 574 that fits within the first housing body 572 and telescopes therein. The first housing body 572 comprises a first longitudinal blade 576 and a first perpendicular blade element 578 on an end thereof and a slot 580 through which a second longitudinal blade 582 extends from the second housing body 574. The second housing body 574 may have a second perpendicular blade element 584 on an end thereof. The second housing body 574 may further have markings or tabs 586 which may aid a user in setting the second housing 574 and the first housing 572 in a telescoped arrangement, depending on the size of the cut line needed in pizza dough, or the area coverage necessary to prevent ingredients from being placed thereon to form a bare area.

Thus, the first and second longitudinal blades 576, 582, and the first and second longitudinal elements may be pressed into the pizza dough, thereby cutting the pizza dough to form the fold flaps, as described above with reference to FIGS. 19-21. Alternatively, the first and second housing bodies 572, 574 may be telescoped relative to each other to form a cap to dispose over the pizza dough to form a clear area having no ingredients thereon, as described above with reference to FIGS. 17-18.

It should be noted that the crust portion formed in discrete locations within the perimeter of the pizza dough substrate may be formed by other methods and apparatuses as well. For example, a maker of pizza may simply spread dough on a pan and prior to adding ingredients thereto may simply gather, bunch, or pinch the existing dough with his or her hands in discrete strips or locations on the pizza substrate, thereby forming ridges in the resulting pizza in specific locations. These ridges may be avoided when adding ingredients thereto and after baking and cutting the pizza into pieces, via the straight-cut method, a crust may be provided on each piece.

Figure 24:
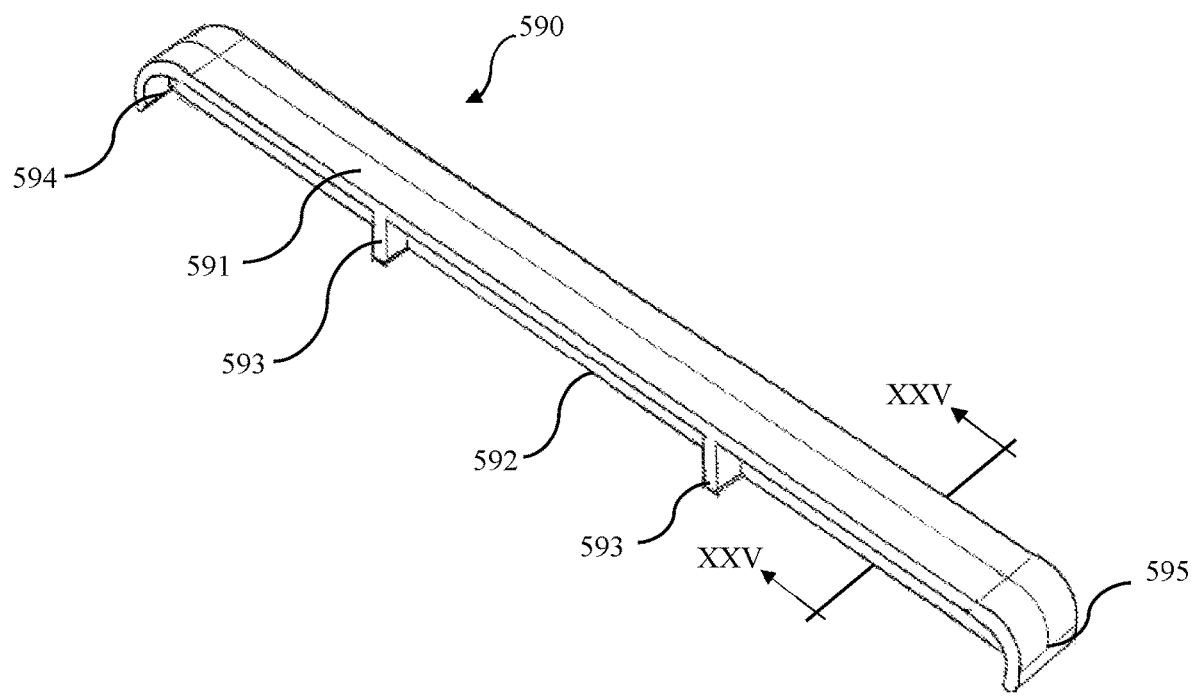
FIG. 24 illustrates a perspective view of a pizza dough gathering and forming tool in an embodiment of the present invention.
Figure 25:
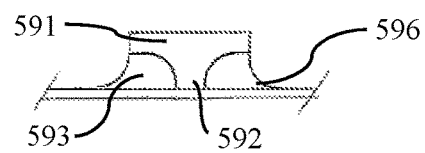
FIG. 25 illustrates a cross-sectional view of a pizza dough gathering and forming tool in an embodiment of the present invention.

FIG. 24 illustrates a pizza dough gathering or pinching tool 590 that may be utilized to precisely create the discrete strips forming ridges in the flat pizza dough substrate. Specifically, the pizza dough gathering or pinching tool 590 may comprise an elongated flat portion 592 having a downwardly extending elongated tab or blade 594. The elongated flat portion 592 may have a first leg 596 on a first end thereof and a second leg 598 on a second end thereof. Reinforcement legs 595 may be periodically spaced along the elongated flat portion, intersecting with the tab or blade 594 to further ensure that the pizza dough gathering or pinching tool 590 remains upright when placed onto a flat pizza dough substrate. Specifically, when placed on top of the flat pizza dough substrate, the user may push, gather, pinch, or otherwise move pizza dough toward the tool 590 from therearound and press the dough into spaces formed beneath the elongated flat portion 592. Alternatively, the user may add an amount of dough along either side and press the same into the spaces formed beneath the elongated flat portion 592, thereby forming a pair of ridges running parallel to each other with a depression or valley formed therebetween by the tab or blade 594. FIG. 25 illustrates a cross-sectional view of the tool 590 along lines XXV-XXV having dough 597 pressed therebeneath on opposite sides thereof. When done, the tool 590 may be removed and the gathered or added dough, forming the pair of ridges, may be avoided when adding ingredients, and then cut therethrough along the depression or valley forming pieces, where each piece of the resulting pizza comprises a crust portion thereon.

Figure 26:
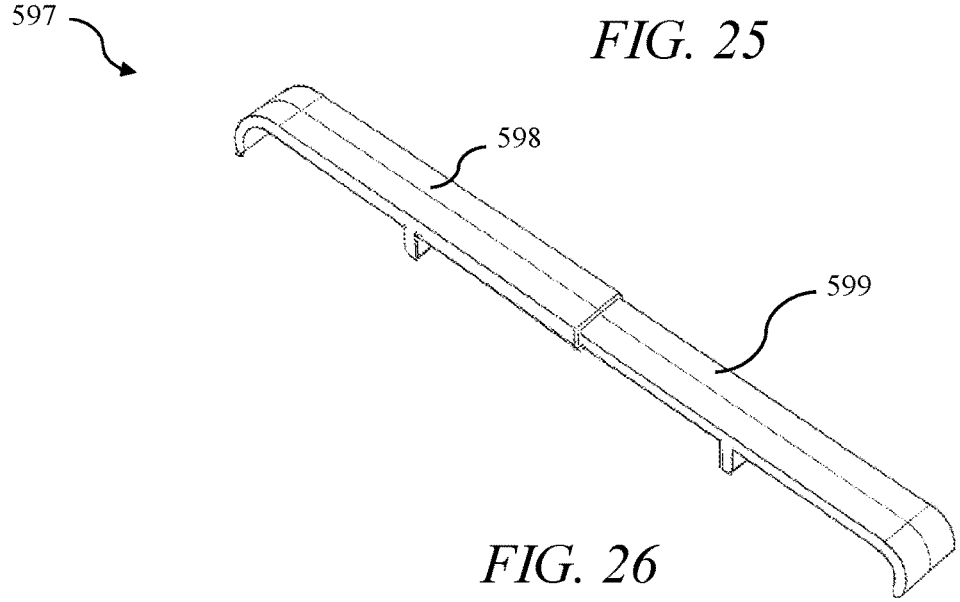
FIG. 26 illustrates a perspective view of a telescoping pizza dough gathering and forming tool in an embodiment of the present invention.

FIG. 26 illustrates an alternate embodiment of a telescoping pizza dough gathering or pinching tool 597 similar to the tool 590 described above with reference to FIGS. 24-25. The tool 597 may have a first arm 598 forming a sleeve for receiving a second arm 599 that may slide within the first arm 598 thereby changing the longitudinal size of the tool 597. Thus, the tool 597 may be utilized on different sized pizzas by changing the longitudinal size thereof by sliding the second arm 599 within the first arm 598.

In another embodiment, a pizza dough pan having the general size and shape of a desired pizza may receive a flat pizza dough substrate thereon, and may have protruding elements, such as mounds, strips, and other like protruding elements that may cause the dough substrate to be pushed upwardly relative to the rest of the pizza dough substrate in discrete locations. The locations may correspond to areas that may remain uncovered by ingredients and may be cut therethrough with a pizza slicer after baking. Specifically, the raised areas, pushed up by the protrusions of the pizza pan, may provide a pizza preparer with a visual indicator of where not to apply ingredients, thereby keeping such areas clear. The pan may further be used in the baking process of the pizza, whereby the bare areas pushed upwardly by the protrusions of the pizza pan may be baked and become relatively stiff compared to the remainder of the pizza dough substrate, thereby providing the added crust to the square-cut pieces cut into the pizza after baking.

Figure 27:
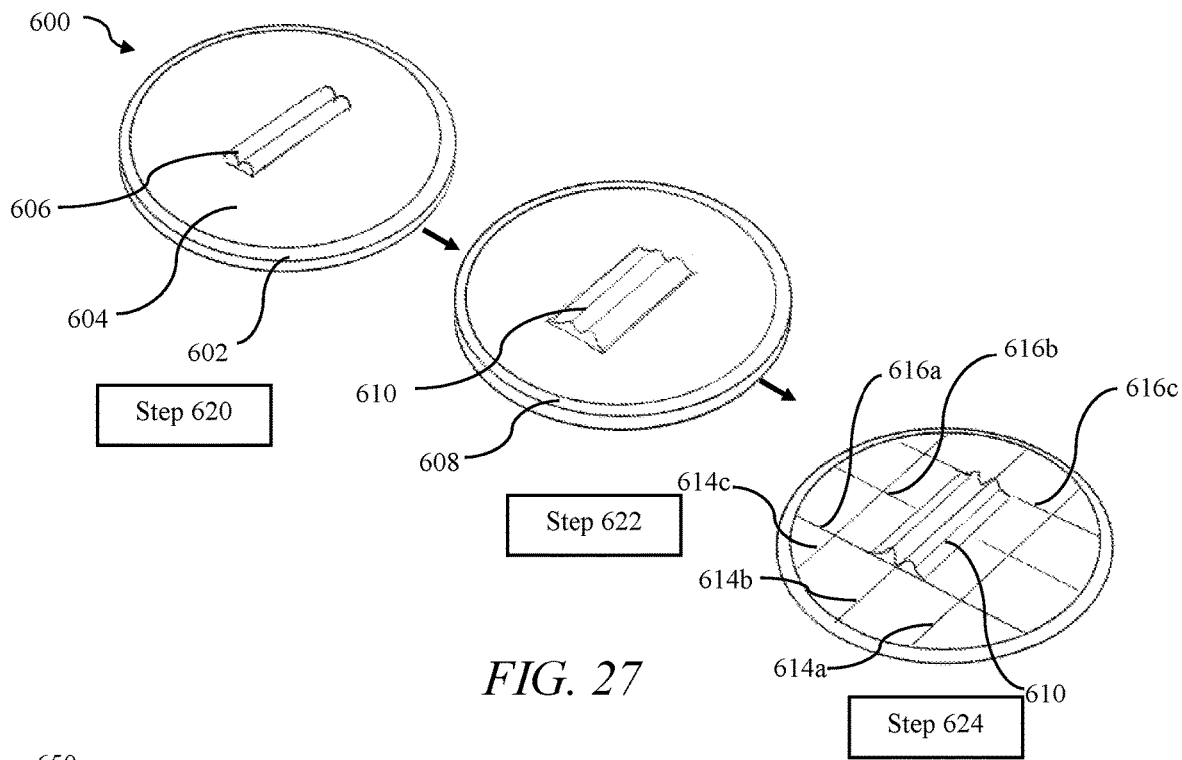
FIG. 27 illustrates a method of forming ridges in a flat pizza dough substrate in an embodiment of the present invention.

FIG. 27 illustrates a pizza pan apparatus 600 used to make a straight-cut pizza as disclosed herein in an exemplary method. In a first step 620, the pizza pan apparatus 600 is provided. The pizza pan apparatus 600 generally has a round shape having an edge 602 and a planar section 604. Within the planar section 604 may be a mounded section 606, which may comprise a longitudinal mounded elevated protrusion positioned to impart a corresponding mounded portion 610 in a flat pizza dough 608 placed thereon, as illustrated in step 612. The mounded portion 610 is illustrated as having a depression in the middle thereof but may be a single mound with such a depression.

The pizza dough 608 may then have ingredients placed thereon on the pizza dough 608, but not on the mounded portion 610, and may be baked. The resultant pizza 612 may then be straight-cut forming cut lines 614a, 614b, 614c and 616a, 616b, 616c, with cut line 614b extending lengthwise through the mounded portion 610, thereby providing a crust portion on each piece of the pizza 612, whether from crust 618 around the perimeter of the pizza 612 or from the mounded portion 610 within the perimeter of the pizza 612.

Figure 28:
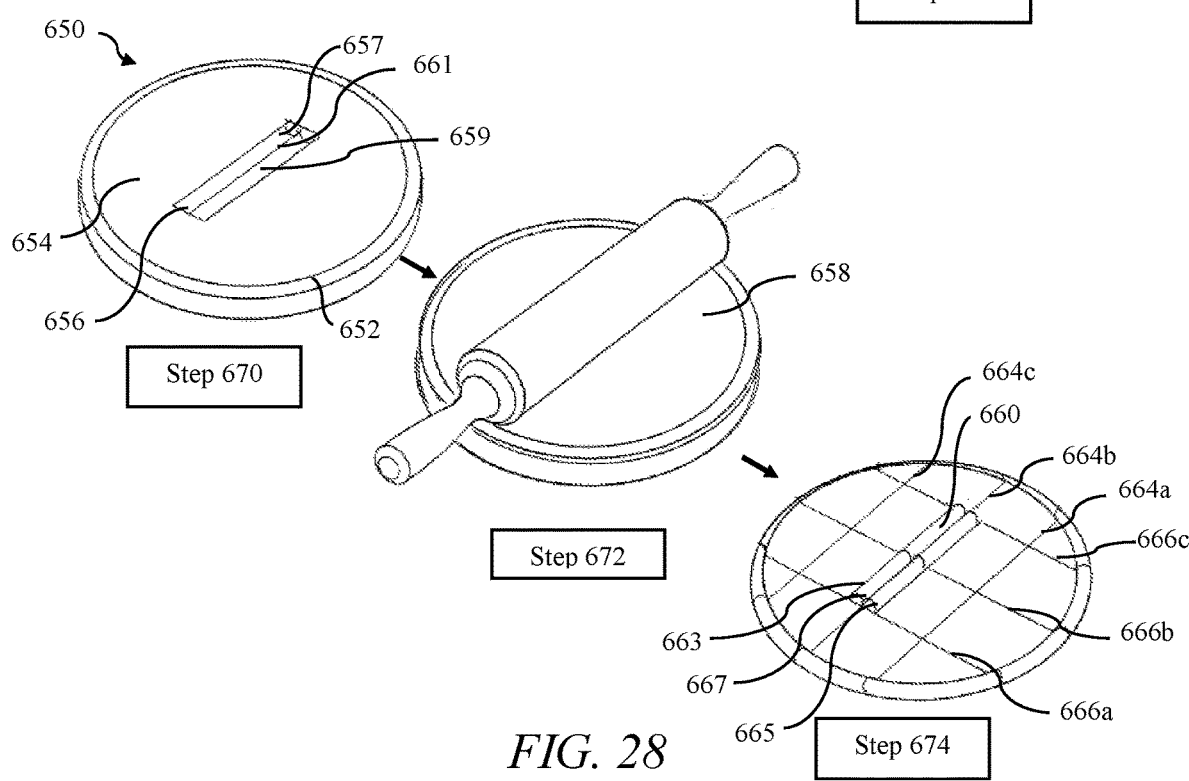
FIG. 28 illustrates a method of forming ridges in a flat pizza dough substrate in an alternate embodiment of the present invention.

FIG. 28 illustrates a pizza pan apparatus 650 used to make a straight-cut pizza as disclosed herein in an alternate exemplary method. In a first Step 670, the pizza pan apparatus 650 is provided. The pizza pan apparatus 650 generally has a round shape having an edge 652 and a planar section 654. Within the planar section 654 may be a depressed section 656, which may comprise a longitudinal depressed portion having a first valley 657, a second valley 659, and a wall 661 separating the first and second valleys 657, 659. The depressed section 656 may be positioned to impart a corresponding mounded portion 660 in a flat pizza dough 658 placed and rolled thereon preferably with additional dough placed within the depressed section 656, as illustrated in Step 672, and flipped over, as illustrated in FIG. 674 to expose the mounded portion 660. The pizza dough 658 may then have ingredients placed thereon but not on the mounded portion 660, which may then be baked, as illustrated in Step 674. The resultant pizza 662 may then be straight-cut forming cut lines 664a, 664b, 664c and 666a, 666b, 666c, with cut line 664b extending lengthwise through the mounded portion 610, specifically through a depression or valley 667 formed between first mounded portion 663 and second mounded portion 665. Thus, each piece of the pizza 662 has a crust portion when cut as described and shown, whether from crust 668 around the perimeter of the pizza 662 or from the mounded portion 660 within the perimeter of the pizza 662.

Likewise, pizza dough may be added to a pizza pan, and a plate may be pressed downwardly from above the pizza dough, thereby forming a pizza dough substrate. The plate may have elements therein that may imprint on the pizza dough substrate and may provide raised areas or markings on the pizza dough substrate that alert a pizza preparer of areas to avoid adding ingredients thereto. Thus, when baked, the bare areas marked by the plate pressed down thereon may form the crust on the center square pieces when square-cut.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

I claim:

1. A pizza comprising:
   a dough substrate comprising a perimeter and a flat sheet portion, the dough substrate comprising a first crust portion around the perimeter;
   an isolated area of exposed dough within the perimeter of the dough substrate forming a second crust portion that is not connected to the first crust portion;
   at least one ingredient covering the dough substrate;
   a first cut line in the dough substrate;
   a second cut line in the dough substrate running longitudinally through the second crust portion, wherein the first cut line and the second cut line form a plurality of pieces, such that a first piece of the plurality of pieces within the perimeter of the dough substrate comprises the first crust portion but not the second crust portion and a second piece of the plurality of pieces within the perimeter of the dough substrate comprises—the second crust portion but not the first crust portion.

2. The pizza of claim 1 wherein the isolated area of exposed dough comprises a thickness greater than the thickness of the flat sheet portion.

3. The pizza of claim 2 wherein the isolated area of exposed dough comprises a depression running longitudinally therein from a first end to a second end thereof.

4. The pizza of claim 2 wherein the isolated area of exposed dough is formed by adding dough to the dough substrate.

5. The pizza of claim 4 wherein the dough added to the dough substrate comprises a depression running longitudinally therein from a first end of the dough to a second end of the dough, wherein the cut line runs through the depression.

6. The pizza of claim 1 wherein each of the plurality of pieces within the perimeter of the dough substrate comprises at least one of the first crust portion and the second crust portion.

7. The pizza of claim 2 wherein the isolated area of exposed dough is formed by cutting the flat sheet portion into at least one flap and folding the at least one flap onto the dough substrate.

8. The pizza of claim 1 wherein the isolated area of exposed dough comprises a height higher than the flat sheet portion.

9. The pizza of claim 7 wherein the area of exposed dough is formed by adding the dough substrate to a pan having a forming element that raises a portion of the flat sheet portion of the dough substrate when disposed thereon, wherein the portion of the flat sheet portion raised by the forming element of the pan forms the isolated area of exposed dough.

10. The pizza of claim 1 wherein the isolated area of exposed dough is formed by masking an area within the perimeter of the dough substrate with a cover, adding the at least one ingredient to the dough substrate except in the area, and removing the cover to expose the isolated area of exposed dough.

11. The pizza of claim 1 comprising a plurality of additional cut lines.

* * * * *